US00RE47019E

(19) United States
(12) Reissued Patent
Thornewell et al.

(10) Patent Number: US RE47,019 E
(45) Date of Reissued Patent: Aug. 28, 2018

(54) METHODS FOR DNSSEC PROXYING AND DEPLOYMENT AMELIORATION AND SYSTEMS THEREOF

(71) Applicant: F5 Networks, Inc., Seattle, WA (US)

(72) Inventors: Peter M. Thornewell, Seattle, WA (US); Christopher R. Baker, Seattle, WA (US)

(73) Assignee: F5 Networks, Inc., Seattle, WA (US)

(21) Appl. No.: 15/286,436

(22) Filed: Oct. 5, 2016

Related U.S. Patent Documents

Reissue of:
(64) Patent No.: 8,856,898
Issued: Oct. 7, 2014
Appl. No.: 13/687,826
Filed: Nov. 28, 2012

U.S. Applications:
(63) Continuation of application No. 12/836,053, filed on Jul. 14, 2010, now Pat. No. 8,347,100.

(51) Int. Cl.

| | |
|---|---|
| ***G06F 21/31*** | (2013.01) |
| ***H04L 9/32*** | (2006.01) |
| ***H04L 29/12*** | (2006.01) |
| ***H04L 29/06*** | (2006.01) |

(52) U.S. Cl.
CPC ..... *H04L 9/3247* (2013.01); *H04L 61/1511* (2013.01); *H04L 63/08* (2013.01); *H04L 63/126* (2013.01)

(58) Field of Classification Search
CPC . H04L 9/3247; H04L 61/1511; H04L 63/126; H04L 63/08
USPC ..... 726/6; 713/176
See application file for complete search history.

(56) References Cited

U.S. PATENT DOCUMENTS

| | | | |
|---|---|---|---|
| 3,950,735 | A | 4/1976 | Patel |
| 4,644,532 | A | 2/1987 | George et al. |
| 4,897,781 | A | 1/1990 | Chang et al. |
| 4,965,772 | A | 10/1990 | Daniel et al. |
| 4,993,030 | A | 2/1991 | Krakauer et al. |

(Continued)

FOREIGN PATENT DOCUMENTS

| | | | |
|---|---|---|---|
| AU | 2003300350 | A1 | 7/2004 |
| CA | 2080530 | | 4/1994 |

(Continued)

OTHER PUBLICATIONS

Laurie, et. al., "DNS Security (DNSSEC) Hashed Authenticated Denial of Existence", Mar. 2008, pp. 1-52, The IETF Trust.

(Continued)

*Primary Examiner* — Jalatee Worjloh
(74) *Attorney, Agent, or Firm* — LeClairRyan PLLC

(57) ABSTRACT

A method, computer readable medium, and device for providing authenticated domain name service includes forwarding at a traffic management device a request for a domain name from a client device to one or more servers coupled to the traffic management device. The traffic management device receives a first response comprising at least a portion of the domain name from the one or more servers. The traffic management device attaches a first signature to the first response when the first response is determined by the traffic management device to be an unauthenticated response, and provides the first response with the first signature to the client device.

36 Claims, 3 Drawing Sheets

(56) References Cited

U.S. PATENT DOCUMENTS 5,023,826 A 6/1991 Patel
5,053,953 A 10/1991 Patel
5,167,024 A 11/1992 Smith et al.
5,218,695 A 6/1993 Noveck et al.
5,282,201 A 1/1994 Frank et al.
5,299,312 A 3/1994 Rocco, Jr.
5,303,368 A 4/1994 Kotaki
5,327,529 A 7/1994 Fults et al.
5,367,635 A 11/1994 Bauer et al.
5,371,852 A 12/1994 Attanasio et al.
5,406,502 A 4/1995 Haramaty et al.
5,473,362 A 12/1995 Fitzgerald et al.
5,475,857 A 12/1995 Dally
5,511,177 A 4/1996 Kagimasa et al.
5,517,617 A 5/1996 Sathaye et al.
5,519,694 A 5/1996 Brewer et al.
5,519,778 A 5/1996 Leighton et al.
5,521,591 A 5/1996 Arora et al.
5,528,701 A 6/1996 Aref
5,537,585 A 7/1996 Blickenstaff et al.
5,548,724 A 8/1996 Akizawa et al.
5,550,965 A 8/1996 Gabbe et al.
5,581,764 A 12/1996 Fitzgerald et al.
5,583,995 A 12/1996 Gardner et al.
5,586,260 A 12/1996 Hu
5,590,320 A 12/1996 Maxey
5,596,742 A 1/1997 Agarwal et al.
5,606,665 A 2/1997 Yang et al.
5,611,049 A 3/1997 Pitts
5,623,490 A 4/1997 Richter et al.
5,649,194 A 7/1997 Miller et al.
5,649,200 A 7/1997 Leblang et al.
5,659,619 A 8/1997 Sudia
5,663,018 A 9/1997 Cummings et al.
5,668,943 A 9/1997 Attanasio et al.
5,692,180 A 11/1997 Lee
5,721,779 A 2/1998 Funk
5,724,512 A 3/1998 Winterbottom
5,752,023 A 5/1998 Choucri et al.
5,761,484 A 6/1998 Agarwal et al.
5,768,423 A 6/1998 Aref et al.
5,774,660 A 6/1998 Brendel et al.
5,790,554 A 8/1998 Pitcher et al.
5,802,052 A 9/1998 Venkataraman
5,806,061 A 9/1998 Chaudhuri et al.
5,812,550 A 9/1998 Sohn et al.
5,825,772 A 10/1998 Dobbins et al.
5,832,283 A 11/1998 Chou et al.
5,832,496 A 11/1998 Anand et al.
5,832,522 A 11/1998 Blickenstaff et al.
5,838,970 A 11/1998 Thomas
5,862,325 A 1/1999 Reed et al.
5,875,296 A 2/1999 Shi et al.
5,884,303 A 3/1999 Brown
5,892,914 A 4/1999 Pitts
5,892,932 A 4/1999 Kim
5,893,086 A 4/1999 Schmuck et al.
5,897,638 A 4/1999 Lasser et al.
5,905,990 A 5/1999 Inglett
5,917,998 A 6/1999 Cabrera et al.
5,919,247 A 7/1999 Van Hoff et al.
5,920,873 A 7/1999 Van Huben et al.
5,936,939 A 8/1999 Des Jardins et al.
5,937,406 A 8/1999 Balabine et al.
5,941,988 A 8/1999 Bhagwat et al.
5,946,690 A 8/1999 Pitts
5,949,885 A 9/1999 Leighton
5,951,694 A 9/1999 Choquier et al.
5,958,053 A 9/1999 Denker
5,959,990 A 9/1999 Frantz et al.
5,974,460 A 10/1999 Maddalozzo, Jr. et al.
5,983,281 A 11/1999 Ogle et al.
5,988,847 A 11/1999 McLaughlin et al.
5,991,302 A 11/1999 Beri et al.
5,995,491 A 11/1999 Richter et al.
5,999,664 A 12/1999 Mahoney et al.
6,006,260 A 12/1999 Barrick, Jr. et al.
6,006,264 A 12/1999 Colby et al.
6,012,083 A 1/2000 Savitzky et al.
6,026,452 A 2/2000 Pitts
6,028,857 A 2/2000 Poor
6,029,168 A 2/2000 Frey
6,029,175 A 2/2000 Chow et al.
6,038,233 A 3/2000 Hamamoto et al.
6,041,365 A 3/2000 Kleinerman
6,044,367 A 3/2000 Wolff
6,047,129 A 4/2000 Frye
6,051,169 A 4/2000 Brown et al.
6,067,558 A 5/2000 Wendt et al.
6,072,942 A 6/2000 Stockwell et al.
6,078,929 A 6/2000 Rao
6,078,956 A 6/2000 Bryant et al.
6,085,234 A 7/2000 Pitts et al.
6,088,694 A 7/2000 Burns et al.
6,092,196 A 7/2000 Reiche
6,104,706 A 8/2000 Richter et al.
6,108,703 A 8/2000 Leighton et al.
6,111,876 A 8/2000 Frantz et al.
6,118,784 A 9/2000 Tsuchiya et al.
6,119,234 A 9/2000 Aziz et al.
6,128,279 A 10/2000 O'Neil et al.
6,128,627 A 10/2000 Mattis et al.
6,128,657 A 10/2000 Okanoya et al.
6,128,717 A 10/2000 Harrison et al.
6,154,777 A 11/2000 Ebrahim
6,160,874 A 12/2000 Dickerman et al.
6,161,145 A 12/2000 Bainbridge et al.
6,161,185 A 12/2000 Guthrie et al.
6,170,022 B1 1/2001 Linville et al.
6,178,423 B1 1/2001 Douceur et al.
6,181,336 B1 1/2001 Chiu et al.
6,182,139 B1 1/2001 Brendel
6,192,051 B1 2/2001 Lipman et al.
6,202,156 B1 3/2001 Kalajan
6,223,206 B1 4/2001 Dan et al.
6,233,612 B1 5/2001 Fruchtman et al.
6,233,648 B1 5/2001 Tomita
6,237,008 B1 5/2001 Beal et al.
6,246,684 B1 6/2001 Chapman et al.
6,253,226 B1 6/2001 Chidambaran et al.
6,253,230 B1 6/2001 Couland et al.
6,256,031 B1 7/2001 Meijer et al.
6,259,405 B1 7/2001 Stewart et al.
6,260,070 B1 7/2001 Shah
6,263,368 B1 7/2001 Martin
6,282,610 B1 8/2001 Bergsten
6,289,012 B1 9/2001 Harrington et al.
6,289,345 B1 9/2001 Yasue
6,292,832 B1 9/2001 Shah et al.
6,298,380 B1 10/2001 Coile et al.
6,304,913 B1 10/2001 Rune
6,308,162 B1 10/2001 Ouimet et al.
6,324,581 B1 11/2001 Xu et al.
6,327,622 B1 12/2001 Jindal et al.
6,330,574 B1 12/2001 Murashita
6,338,082 B1 1/2002 Schneider
6,339,785 B1 1/2002 Feigenbaum
6,343,324 B1 1/2002 Hubis et al.
6,347,339 B1 2/2002 Morris et al.
6,349,343 B1 2/2002 Foody et al.
6,353,848 B1 3/2002 Morris
6,360,270 B1 3/2002 Cherkasova et al.
6,363,056 B1 3/2002 Beigi et al.
6,367,009 B1 4/2002 Davis et al.
6,370,527 B1 4/2002 Singhal
6,374,263 B1 4/2002 Bunger et al.
6,374,300 B2 4/2002 Masters
6,389,433 B1 5/2002 Bolosky et al.
6,389,462 B1 5/2002 Cohen et al.
6,393,581 B1 5/2002 Friedman et al.
6,396,833 B1 5/2002 Zhang et al.
6,397,246 B1 5/2002 Wolfe
6,412,004 B1 6/2002 Chen et al.
6,430,562 B1 8/2002 Kardos et al.

(56) References Cited

U.S. PATENT DOCUMENTS 6,434,081 B1 8/2002 Johnson et al.
6,438,595 B1 8/2002 Blumenau et al.
6,446,108 B1 9/2002 Rosenberg et al.
6,466,580 B1 10/2002 Leung
6,469,983 B2 10/2002 Narayana et al.
6,477,544 B1 11/2002 Bolosky et al.
6,480,476 B1 11/2002 Willars
6,484,261 B1 11/2002 Wiegel
6,487,561 B1 11/2002 Ofek et al.
6,490,624 B1 12/2002 Sampson et al.
6,493,804 B1 12/2002 Soltis et al.
6,510,135 B1 1/2003 Almulhem et al.
6,510,458 B1 1/2003 Berstis et al.
6,513,061 B1 1/2003 Ebata et al.
6,514,085 B2 2/2003 Slattery et al.
6,516,350 B1 2/2003 Lumelsky et al.
6,516,351 B2 2/2003 Borr
6,519,643 B1 2/2003 Foulkes et al.
6,542,936 B1 4/2003 Mayle et al.
6,549,916 B1 4/2003 Sedlar
6,553,352 B2 4/2003 Delurgio et al.
6,556,997 B1 4/2003 Levy
6,556,998 B1 4/2003 Mukherjee et al.
6,560,230 B1 5/2003 Li et al.
6,578,069 B1 6/2003 Hopmann et al.
6,580,717 B1 6/2003 Higuchi et al.
6,601,084 B1 7/2003 Bhaskaran et al.
6,601,101 B1 7/2003 Lee et al.
6,606,663 B1 8/2003 Liao et al.
6,612,490 B1 9/2003 Herrendoerfer et al.
6,615,267 B1 9/2003 Whalen et al.
6,636,503 B1 10/2003 Shiran et al.
6,636,894 B1 10/2003 Short et al.
6,650,640 B1 11/2003 Muller et al.
6,650,641 B1 11/2003 Albert et al.
6,654,346 B1 11/2003 Mahalingaiah et al.
6,654,701 B2 11/2003 Hatley
6,661,802 B1 12/2003 Homberg et al.
6,683,873 B1 1/2004 Kwok et al.
6,690,669 B1 2/2004 Tsuchiya et al.
6,691,165 B1 2/2004 Bruck et al.
6,694,517 B1 2/2004 James et al.
6,701,415 B1 3/2004 Hendren, III
6,708,187 B1 3/2004 Shanumgam et al.
6,718,380 B1 4/2004 Mohaban et al.
6,721,794 B2 4/2004 Taylor et al.
6,728,704 B2 4/2004 Mao et al.
6,738,357 B1 5/2004 Richter et al.
6,738,790 B1 5/2004 Klein
6,742,035 B1 5/2004 Zayas et al.
6,742,045 B1 5/2004 Albert et al.
6,744,776 B1 6/2004 Kalkunte et al.
6,748,420 B1 6/2004 Quatrano et al.
6,751,663 B1 6/2004 Farrell et al.
6,754,215 B1 6/2004 Arikawa et al.
6,754,228 B1 6/2004 Ludwig
6,754,699 B2 6/2004 Swildens et al.
6,757,706 B1 6/2004 Dong et al.
6,760,337 B1 7/2004 Snyder, II et al.
6,760,775 B1 7/2004 Anerousis et al.
6,772,219 B1 8/2004 Shobatake
6,775,672 B2 8/2004 Mahalingam et al.
6,775,673 B2 8/2004 Mahalingam et al.
6,775,679 B2 8/2004 Gupta
6,779,039 B1 8/2004 Bommareddy et al.
6,781,986 B1 8/2004 Sabaa et al.
6,782,450 B2 8/2004 Arnott et al.
6,795,860 B1 9/2004 Shah
6,798,777 B1 9/2004 Ferguson et al.
6,801,960 B1 10/2004 Ericson et al.
6,804,542 B1 10/2004 Haartsen
6,816,901 B1 11/2004 Sitaraman et al.
6,816,977 B2 11/2004 Brakmo et al.
6,826,613 B1 11/2004 Wang et al.
6,829,238 B2 12/2004 Tokuyo et al.
6,839,761 B2 1/2005 Kadyk et al.
6,839,850 B1 1/2005 Campbell et al.
6,847,959 B1 1/2005 Arrouye et al.
6,847,970 B2 1/2005 Keller et al.
6,850,997 B1 2/2005 Rooney et al.
6,865,593 B1 3/2005 Reshef et al.
6,868,082 B1 3/2005 Allen, Jr. et al.
6,868,447 B1 3/2005 Slaughter et al.
6,871,221 B1 3/2005 Styles
6,871,245 B2 3/2005 Bradley
6,876,629 B2 4/2005 Beshai et al.
6,876,654 B1 4/2005 Hegde
6,880,017 B1 4/2005 Marce et al.
6,883,137 B1 4/2005 Girardot et al.
6,888,836 B1 5/2005 Cherkasova
6,889,249 B2 5/2005 Miloushev et al.
6,907,037 B2 6/2005 Tsuchiya et al.
6,912,219 B2 6/2005 Tsuchiya et al.
6,914,881 B1 7/2005 Mansfield et al.
6,920,136 B2 7/2005 Tsuchiya et al.
6,920,137 B2 7/2005 Tsuchiya et al.
6,920,138 B2 7/2005 Tsuchiya et al.
6,922,688 B1 7/2005 Frey, Jr.
6,928,077 B2 8/2005 Tsuchiya et al.
6,928,082 B2 8/2005 Liu et al.
6,934,706 B1 8/2005 Mancuso et al.
6,938,039 B1 8/2005 Bober et al.
6,938,059 B2 8/2005 Tamer et al.
6,947,985 B2 9/2005 Hegli et al.
6,950,434 B1 9/2005 Viswanath et al.
6,954,780 B2 10/2005 Susai et al.
6,957,272 B2 10/2005 Tallegas et al.
6,959,373 B2 10/2005 Testardi
6,959,394 B1 10/2005 Brickell et al.
6,961,815 B2 11/2005 Kistler et al.
6,970,924 B1 11/2005 Chu et al.
6,973,455 B1 12/2005 Vahalia et al.
6,973,490 B1 12/2005 Robertson et al.
6,973,549 B1 12/2005 Testardi
6,975,592 B1 12/2005 Seddigh et al.
6,985,936 B2 1/2006 Agarwalla et al.
6,985,956 B2 1/2006 Luke et al.
6,986,015 B2 1/2006 Testardi
6,986,040 B1 1/2006 Kramer et al.
6,987,763 B2 1/2006 Rochberger et al.
6,990,074 B2 1/2006 Wan et al.
6,990,114 B1 1/2006 Erimli et al.
6,990,547 B2 1/2006 Ulrich et al.
6,990,667 B2 1/2006 Ulrich et al.
6,996,841 B2 2/2006 Kadyk et al.
7,003,533 B2 2/2006 Noguchi et al.
7,003,564 B2 2/2006 Greuel et al.
7,006,981 B2 2/2006 Rose et al.
7,007,092 B2 2/2006 Peiffer
7,010,553 B2 3/2006 Chen et al.
7,013,379 B1 3/2006 Testardi
7,020,644 B2 3/2006 Jameson
7,020,699 B2 3/2006 Zhang et al.
7,023,974 B1 4/2006 Brannam et al.
7,024,427 B2 4/2006 Bobbitt et al.
7,028,182 B1 * 4/2006 Killcommons ..... 713/161
7,039,061 B2 5/2006 Connor et al.
7,051,112 B2 5/2006 Dawson
7,054,998 B2 5/2006 Arnott et al.
7,058,633 B1 6/2006 Gnagy et al.
7,065,482 B2 6/2006 Shorey et al.
7,072,338 B2 7/2006 Tsuchiya et al.
7,072,339 B2 7/2006 Tsuchiya et al.
7,072,917 B2 7/2006 Wong et al.
7,075,924 B2 7/2006 Richter et al.
7,076,689 B2 7/2006 Atkinson
7,080,314 B1 7/2006 Garofalakis et al.
7,088,726 B1 8/2006 Hamamoto et al.
7,089,286 B1 8/2006 Malik
7,089,491 B2 8/2006 Feinberg et al.
7,111,115 B2 9/2006 Peters et al.
7,113,962 B1 9/2006 Kee et al.
7,113,993 B1 9/2006 Cappiello et al.
7,113,996 B2 9/2006 Kronenberg

(56) References Cited

U.S. PATENT DOCUMENTS 7,120,128 B2 10/2006 Banks et al.
7,120,746 B2 10/2006 Campbell et al.
7,127,556 B2 10/2006 Blumenau et al.
7,133,863 B2 11/2006 Teng et al.
7,133,944 B2 11/2006 Song et al.
7,133,967 B2 11/2006 Fujie et al.
7,139,792 B1 11/2006 Mishra et al.
7,143,146 B2 11/2006 Nakatani et al.
7,146,524 B2 12/2006 Patel et al.
7,152,184 B2 12/2006 Maeda et al.
7,155,466 B2 12/2006 Rodriguez et al.
7,158,526 B2 1/2007 Higuchi et al.
7,162,529 B2 1/2007 Morishige et al.
7,165,095 B2 1/2007 Sim
7,167,821 B2 1/2007 Hardwick et al.
7,171,496 B2 1/2007 Tanaka et al.
7,173,929 B1 2/2007 Testardi
7,185,359 B2 2/2007 Schmidt et al.
7,191,163 B2 3/2007 Herrera et al.
7,193,998 B2 3/2007 Tsuchiya et al.
7,194,579 B2 3/2007 Robinson et al.
7,209,759 B1 4/2007 Billing et al.
7,228,359 B1 6/2007 Monteiro
7,228,422 B2 6/2007 Morioka et al.
7,234,074 B2 6/2007 Cohn et al.
7,236,491 B2 6/2007 Tsao et al.
7,240,100 B1 7/2007 Wein et al.
7,248,591 B2 7/2007 Hamamoto et al.
7,251,247 B2 7/2007 Hamamoto et al.
7,280,536 B2 10/2007 Testardi
7,280,971 B1 10/2007 Wimberly et al.
7,283,540 B2 10/2007 Hamamoto et al.
7,284,150 B2 10/2007 Ma et al.
7,287,082 B1 10/2007 O'Toole, Jr.
7,292,541 B1 11/2007 C S
7,293,097 B2 11/2007 Borr
7,293,099 B1 11/2007 Kalajan
7,293,133 B1 11/2007 Colgrove et al.
7,295,827 B2 11/2007 Liu et al.
7,296,263 B1 11/2007 Jacob
7,299,491 B2 * 11/2007 Shelest et al. ..... 726/4
7,305,480 B2 12/2007 Oishi et al.
7,308,475 B1 12/2007 Pruitt et al.
7,308,703 B2 12/2007 Wright et al.
7,308,709 B1 12/2007 Brezak et al.
7,310,339 B1 12/2007 Powers et al.
7,315,543 B2 1/2008 Takeuchi et al.
7,319,696 B2 1/2008 Inoue et al.
7,321,926 B1 1/2008 Zhang et al.
7,324,533 B1 1/2008 DeLiberato et al.
7,328,009 B2 2/2008 Takeda et al.
7,328,281 B2 2/2008 Takeda et al.
7,333,999 B1 2/2008 Njemanze
7,343,398 B1 3/2008 Lownsbrough
7,343,413 B2 3/2008 Gilde et al.
7,346,664 B2 3/2008 Wong et al.
7,349,391 B2 3/2008 Ben-Dor et al.
7,383,288 B2 6/2008 Miloushev et al.
7,383,570 B2 6/2008 Pinkas et al.
7,385,989 B2 6/2008 Higuchi et al.
7,394,804 B2 7/2008 Miyata et al.
7,398,552 B2 7/2008 Pardee et al.
7,400,645 B2 7/2008 Tsuchiya et al.
7,400,646 B2 7/2008 Tsuchiya et al.
7,401,220 B2 7/2008 Bolosky et al.
7,403,520 B2 7/2008 Tsuchiya et al.
7,406,484 B1 7/2008 Srinivasan et al.
7,409,440 B1 8/2008 Jacob
7,415,488 B1 8/2008 Muth et al.
7,415,608 B2 8/2008 Bolosky et al.
7,433,962 B2 10/2008 Janssen et al.
7,437,478 B2 10/2008 Yokota et al.
7,440,982 B2 10/2008 Lu et al.
7,441,429 B1 10/2008 Nucci et al.
7,454,480 B2 11/2008 Labio et al.
7,457,982 B2 11/2008 Rajan
7,467,158 B2 12/2008 Marinescu
7,475,241 B2 1/2009 Patel et al.
7,477,796 B2 1/2009 Sasaki et al.
7,490,162 B1 2/2009 Masters
7,500,243 B2 3/2009 Huetsch et al.
7,500,269 B2 3/2009 Huotari et al.
7,505,795 B1 3/2009 Lim et al.
7,509,322 B2 3/2009 Miloushev et al.
7,512,673 B2 3/2009 Miloushev et al.
7,516,492 B1 4/2009 Nisbet et al.
7,519,813 B1 4/2009 Cox et al.
7,522,581 B2 4/2009 Acharya et al.
7,526,541 B2 4/2009 Roese et al.
7,558,197 B1 7/2009 Sindhu et al.
7,562,110 B2 7/2009 Miloushev et al.
7,571,168 B2 8/2009 Bahar et al.
7,574,433 B2 8/2009 Engel
7,577,141 B2 8/2009 Kamata et al.
7,577,723 B2 8/2009 Matsuda et al.
7,580,971 B1 8/2009 Gollapudi et al.
7,587,471 B2 9/2009 Yasuda et al.
7,590,732 B2 9/2009 Rune
7,590,747 B2 9/2009 Coates et al.
7,599,941 B2 10/2009 Bahar et al.
7,610,307 B2 10/2009 Havewala et al.
7,610,390 B2 10/2009 Yared et al.
7,620,733 B1 * 11/2009 Tzakikario et al. ..... 709/245
7,624,109 B2 11/2009 Testardi
7,624,424 B2 11/2009 Morita et al.
7,639,883 B2 12/2009 Gill
7,644,109 B2 1/2010 Manley et al.
7,644,137 B2 1/2010 Bozak et al.
7,653,077 B2 1/2010 Hamamoto et al.
7,653,699 B1 1/2010 Colgrove et al.
7,668,166 B1 2/2010 Rekhter et al.
7,689,596 B2 3/2010 Tsunoda
7,689,710 B2 3/2010 Tang et al.
7,694,082 B2 4/2010 Golding et al.
7,701,952 B2 4/2010 Higuchi et al.
7,711,771 B2 5/2010 Kirnos
7,724,657 B2 5/2010 Rao et al.
7,725,093 B2 5/2010 Sengupta et al.
7,734,603 B1 6/2010 McManis
7,743,035 B2 6/2010 Chen et al.
7,746,863 B2 6/2010 Tsuchiya et al.
7,752,294 B2 7/2010 Meyer et al.
7,761,597 B2 7/2010 Takeda et al.
7,769,711 B2 8/2010 Srinivasan et al.
7,778,187 B2 8/2010 Chaturvedi et al.
7,788,335 B2 8/2010 Miloushev et al.
7,788,408 B2 8/2010 Takeda et al.
7,801,978 B1 9/2010 Susai et al.
7,808,913 B2 10/2010 Ansari et al.
7,822,939 B1 10/2010 Veprinsky et al.
7,831,639 B1 11/2010 Panchbudhe et al.
7,831,662 B2 11/2010 Clark et al.
7,849,112 B2 12/2010 Mane et al.
7,870,154 B2 1/2011 Shitomi et al.
7,877,511 B1 1/2011 Berger et al.
7,885,970 B2 2/2011 Lacapra
7,908,245 B2 3/2011 Nakano et al.
7,908,314 B2 3/2011 Yamaguchi et al.
7,913,053 B1 3/2011 Newland
7,921,211 B2 * 4/2011 Larson et al. ..... 709/226
7,925,908 B2 4/2011 Kim
7,930,365 B2 4/2011 Dixit et al.
7,933,946 B2 4/2011 Livshits et al.
7,941,517 B2 5/2011 Migault et al.
7,941,563 B2 5/2011 Takeda et al.
7,945,908 B1 5/2011 Waldspurger et al.
7,953,701 B2 5/2011 Okitsu et al.
7,957,405 B2 6/2011 Higuchi et al.
7,958,347 B1 6/2011 Ferguson
7,965,724 B2 6/2011 Hamamoto et al.
7,984,141 B2 7/2011 Gupta et al.
8,005,953 B2 8/2011 Miloushev et al.
8,031,716 B2 10/2011 Tsuchiya et al.
8,069,225 B2 11/2011 McCanne et al.

(56) References Cited

U.S. PATENT DOCUMENTS

| | | | |
|---|---|---|---|
| 8,103,781 | B1 | 1/2012 | Wu et al. |
| 8,107,471 | B2 | 1/2012 | Nakamura et al. |
| 8,130,650 | B2 | 3/2012 | Allen, Jr. et al. |
| 8,131,863 | B2 | 3/2012 | Takeda et al. |
| 8,189,567 | B2 | 5/2012 | Kavanagh et al. |
| 8,199,757 | B2 | 6/2012 | Pani et al. |
| 8,205,246 | B2 | 6/2012 | Shatzkamer et al. |
| 8,239,954 | B2 | 8/2012 | Wobber et al. |
| 8,266,427 | B2 | 9/2012 | Thubert et al. |
| 8,274,895 | B2 | 9/2012 | Rahman et al. |
| 8,281,383 | B2 | 10/2012 | Levy-Abegnoli et al. |
| 8,289,968 | B1 | 10/2012 | Zhuang |
| 8,321,908 | B2 | 11/2012 | Gai et al. |
| 8,351,333 | B2 | 1/2013 | Rao et al. |
| 8,379,640 | B2 | 2/2013 | Ichihashi et al. |
| 8,380,854 | B2 | 2/2013 | Szabo |
| 8,417,817 | B1 | 4/2013 | Jacobs |
| 8,437,345 | B2 | 5/2013 | Takeda et al. |
| 8,447,871 | B1 | 5/2013 | Szabo |
| 8,447,970 | B2 | 5/2013 | Klein et al. |
| 8,464,265 | B2 | 6/2013 | Worley |
| 8,468,267 | B2 | 6/2013 | Yigang |
| 8,477,804 | B2 | 7/2013 | Yoshimoto et al. |
| 8,488,465 | B2 | 7/2013 | Solis et al. |
| 8,539,224 | B2 | 9/2013 | Henderson et al. |
| 8,566,474 | B2 | 10/2013 | Kanode et al. |
| 8,578,050 | B2 | 11/2013 | Craig et al. |
| 8,582,599 | B2 | 11/2013 | Hamamoto et al. |
| 8,594,108 | B2 | 11/2013 | Tsuchiya et al. |
| 8,601,161 | B2 | 12/2013 | Takeda et al. |
| 8,606,921 | B2 | 12/2013 | Vasquez et al. |
| 8,615,022 | B2 | 12/2013 | Harrison et al. |
| 8,646,067 | B2 | 2/2014 | Agarwal et al. |
| 8,665,868 | B2 | 3/2014 | Kay |
| 8,665,969 | B2 | 3/2014 | Kay |
| 8,701,179 | B1 | 4/2014 | Penno et al. |
| 8,725,836 | B2 | 5/2014 | Lowery et al. |
| 8,726,336 | B2 | 5/2014 | Narayanaswamy et al. |
| 8,726,338 | B2 | 5/2014 | Narayanaswamy et al. |
| 8,737,304 | B2 | 5/2014 | Karuturi et al. |
| 8,788,665 | B2 | 7/2014 | Glide et al. |
| 8,804,504 | B1 | 8/2014 | Chen |
| 8,819,109 | B1 | 8/2014 | Krishnamurthy et al. |
| 8,819,419 | B2 | 8/2014 | Carlson et al. |
| 8,819,768 | B1 | 8/2014 | Koeten et al. |
| 8,830,874 | B2 | 9/2014 | Cho et al. |
| 8,873,753 | B2 | 10/2014 | Parker |
| 8,875,274 | B2 | 10/2014 | Montemurro et al. |
| 8,886,981 | B1 | 11/2014 | Baumann et al. |
| 8,908,545 | B1 | 12/2014 | Chen et al. |
| 8,954,080 | B2 | 2/2015 | Janakiriman et al. |
| 9,037,166 | B2 | 5/2015 | de Wit et al. |
| 9,077,554 | B1 | 7/2015 | Szabo |
| 9,083,760 | B1 | 7/2015 | Hughes et al. |
| 9,088,525 | B2 | 7/2015 | Takeda et al. |
| 9,106,699 | B2 | 8/2015 | Thornewell et al. |
| 2001/0007560 | A1 | 7/2001 | Masuda et al. |
| 2001/0009554 | A1 | 7/2001 | Katseff et al. |
| 2001/0014891 | A1 | 8/2001 | Hoffert et al. |
| 2001/0023442 | A1 | 9/2001 | Masters |
| 2001/0047293 | A1 | 11/2001 | Waller et al. |
| 2001/0051955 | A1 | 12/2001 | Wong |
| 2002/0010783 | A1 | 1/2002 | Primak et al. |
| 2002/0012352 | A1 | 1/2002 | Hansson et al. |
| 2002/0032777 | A1 | 3/2002 | Kawata et al. |
| 2002/0035537 | A1 | 3/2002 | Waller et al. |
| 2002/0038360 | A1 | 3/2002 | Andrews et al. |
| 2002/0049842 | A1 | 4/2002 | Huetsch et al. |
| 2002/0059263 | A1 | 5/2002 | Shima et al. |
| 2002/0059428 | A1 | 5/2002 | Susai et al. |
| 2002/0065810 | A1 | 5/2002 | Bradley |
| 2002/0065848 | A1 | 5/2002 | Walker et al. |
| 2002/0073105 | A1 | 6/2002 | Noguchi et al. |
| 2002/0083067 | A1 | 6/2002 | Tamayo et al. |
| 2002/0083118 | A1 | 6/2002 | Sim |
| 2002/0087571 | A1 | 7/2002 | Stapel et al. |
| 2002/0087744 | A1 | 7/2002 | Kitchin |
| 2002/0087887 | A1 | 7/2002 | Busam et al. |
| 2002/0099829 | A1 | 7/2002 | Richards et al. |
| 2002/0103823 | A1 | 8/2002 | Jackson et al. |
| 2002/0103916 | A1 | 8/2002 | Chen et al. |
| 2002/0112061 | A1 | 8/2002 | Shih et al. |
| 2002/0133330 | A1 | 9/2002 | Loisey et al. |
| 2002/0133491 | A1 | 9/2002 | Sim et al. |
| 2002/0138615 | A1 | 9/2002 | Schmeling |
| 2002/0143819 | A1 | 10/2002 | Han et al. |
| 2002/0143909 | A1 | 10/2002 | Botz et al. |
| 2002/0147630 | A1 | 10/2002 | Rose et al. |
| 2002/0150253 | A1 | 10/2002 | Brezak et al. |
| 2002/0156905 | A1 | 10/2002 | Weissman |
| 2002/0160161 | A1 | 10/2002 | Misuda |
| 2002/0161911 | A1 | 10/2002 | Pinckney, III et al. |
| 2002/0161913 | A1 | 10/2002 | Gonzalez et al. |
| 2002/0162118 | A1 | 10/2002 | Levy et al. |
| 2002/0174216 | A1 | 11/2002 | Shorey et al. |
| 2002/0188667 | A1 | 12/2002 | Kirnos |
| 2002/0194112 | A1 | 12/2002 | dePinto et al. |
| 2002/0194342 | A1 | 12/2002 | Lu et al. |
| 2002/0198956 | A1 | 12/2002 | Dunshea et al. |
| 2002/0198993 | A1 | 12/2002 | Cudd et al. |
| 2003/0005172 | A1 | 1/2003 | Chessell |
| 2003/0009429 | A1 | 1/2003 | Jameson |
| 2003/0009528 | A1 | 1/2003 | Sharif et al. |
| 2003/0012382 | A1 | 1/2003 | Ferchichi et al. |
| 2003/0018450 | A1 | 1/2003 | Carley |
| 2003/0018585 | A1 | 1/2003 | Butler et al. |
| 2003/0028514 | A1 | 2/2003 | Lord et al. |
| 2003/0033308 | A1 | 2/2003 | Patel et al. |
| 2003/0033535 | A1 | 2/2003 | Fisher et al. |
| 2003/0037070 | A1 | 2/2003 | Marston |
| 2003/0046291 | A1 | 3/2003 | Fascenda |
| 2003/0055723 | A1 | 3/2003 | English |
| 2003/0061240 | A1 | 3/2003 | McCann et al. |
| 2003/0065951 | A1 | 4/2003 | Igeta et al. |
| 2003/0065956 | A1 | 4/2003 | Belapurkar et al. |
| 2003/0067923 | A1* | 4/2003 | Ju ..... H04L 29/12066 370/395.3 |
| 2003/0069918 | A1 | 4/2003 | Lu et al. |
| 2003/0069974 | A1 | 4/2003 | Lu et al. |
| 2003/0070069 | A1 | 4/2003 | Belapurkar et al. |
| 2003/0074301 | A1 | 4/2003 | Solomon |
| 2003/0074434 | A1 | 4/2003 | Jason et al. |
| 2003/0086415 | A1 | 5/2003 | Bernhard et al. |
| 2003/0105846 | A1 | 6/2003 | Zhao et al. |
| 2003/0105983 | A1 | 6/2003 | Brakimo et al. |
| 2003/0108052 | A1 | 6/2003 | Inoue et al. |
| 2003/0115218 | A1 | 6/2003 | Bobbitt et al. |
| 2003/0115439 | A1 | 6/2003 | Mahalingam et al. |
| 2003/0128708 | A1 | 7/2003 | Inoue et al. |
| 2003/0130945 | A1 | 7/2003 | Force et al. |
| 2003/0139934 | A1 | 7/2003 | Mandera |
| 2003/0140140 | A1 | 7/2003 | Lahtinen |
| 2003/0145062 | A1 | 7/2003 | Sharma et al. |
| 2003/0145233 | A1 | 7/2003 | Poletto et al. |
| 2003/0149781 | A1 | 8/2003 | Yared et al. |
| 2003/0156586 | A1 | 8/2003 | Lee et al. |
| 2003/0159072 | A1 | 8/2003 | Bellinger et al. |
| 2003/0163576 | A1 | 8/2003 | Janssen et al. |
| 2003/0171978 | A1 | 9/2003 | Jenkins et al. |
| 2003/0177364 | A1 | 9/2003 | Walsh et al. |
| 2003/0177388 | A1 | 9/2003 | Botz et al. |
| 2003/0179755 | A1 | 9/2003 | Fraser |
| 2003/0191812 | A1 | 10/2003 | Agarwalla et al. |
| 2003/0195813 | A1 | 10/2003 | Pallister et al. |
| 2003/0204635 | A1 | 10/2003 | Ko et al. |
| 2003/0212954 | A1 | 11/2003 | Patrudu |
| 2003/0220835 | A1 | 11/2003 | Barnes, Jr. |
| 2003/0221000 | A1 | 11/2003 | Cherkasova et al. |
| 2003/0225485 | A1 | 12/2003 | Fritz et al. |
| 2003/0229665 | A1 | 12/2003 | Ryman |
| 2003/0236995 | A1 | 12/2003 | Fretwell, Jr. |
| 2004/0003266 | A1 | 1/2004 | Moshir et al. |
| 2004/0003287 | A1 | 1/2004 | Zissimopoulos et al. |
| 2004/0006575 | A1 | 1/2004 | Visharam et al. |

(56) References Cited

U.S. PATENT DOCUMENTS

2004/0006591 A1 1/2004 Matsui et al.
2004/0010654 A1 1/2004 Yasuda et al.
2004/0015783 A1 1/2004 Lennon et al.
2004/0017825 A1 1/2004 Stanwood et al.
2004/0025013 A1 2/2004 Parker et al.
2004/0028043 A1 2/2004 Maveli et al.
2004/0028063 A1 2/2004 Roy et al.
2004/0030627 A1 2/2004 Sedukhin
2004/0030740 A1 2/2004 Stelting
2004/0030857 A1 2/2004 Krakirian et al.
2004/0043758 A1 3/2004 Sorvari et al.
2004/0054777 A1 3/2004 Ackaouy et al.
2004/0059789 A1 3/2004 Shum
2004/0064544 A1 4/2004 Barsness et al.
2004/0064554 A1 4/2004 Kuno et al.
2004/0072569 A1 4/2004 Omae et al.
2004/0093474 A1 5/2004 Lin et al.
2004/0098383 A1 5/2004 Tabellion et al.
2004/0103283 A1 5/2004 Hornak
2004/0111523 A1 6/2004 Hall et al.
2004/0111621 A1 6/2004 Himberger et al.
2004/0117493 A1 6/2004 Bazot et al.
2004/0122926 A1 6/2004 Moore et al.
2004/0123277 A1 6/2004 Schrader et al.
2004/0133605 A1 7/2004 Chang et al.
2004/0133606 A1 7/2004 Miloushev et al.
2004/0138858 A1 7/2004 Carley
2004/0139355 A1 7/2004 Axel et al.
2004/0148380 A1 7/2004 Meyer et al.
2004/0141185 A1 8/2004 Akama
2004/0151186 A1 8/2004 Akama
2004/0153479 A1 8/2004 Mikesell et al.
2004/0167967 A1 8/2004 Bastian et al.
2004/0181605 A1 9/2004 Nakatani et al.
2004/0192312 A1 9/2004 Li et al.
2004/0199547 A1 10/2004 Winter et al.
2004/0213156 A1 10/2004 Smallwood et al.
2004/0215665 A1 10/2004 Edgar et al.
2004/0236798 A1 11/2004 Srinivasan et al.
2004/0236826 A1 11/2004 Harville et al.
2004/0264472 A1 12/2004 Oliver et al.
2004/0264481 A1 12/2004 Darling et al.
2004/0267920 A1 12/2004 Hydrie et al.
2004/0267948 A1 12/2004 Oliver et al.
2004/0268358 A1 12/2004 Darling et al.
2005/0004887 A1 1/2005 Igakura et al.
2005/0021615 A1 1/2005 Arnott et al.
2005/0021703 A1 1/2005 Cherry et al.
2005/0021736 A1 1/2005 Carusi et al.
2005/0027841 A1 2/2005 Rolfe
2005/0027869 A1 2/2005 Johnson
2005/0028010 A1 2/2005 Wallman
2005/0044158 A1 2/2005 Malik
2005/0044213 A1 2/2005 Kobayashi et al.
2005/0050107 A1 3/2005 Mane et al.
2005/0052440 A1 3/2005 Kim et al.
2005/0055435 A1 3/2005 Gbadegesin et al.
2005/0078604 A1 4/2005 Yim
2005/0091214 A1 4/2005 Probert et al.
2005/0108575 A1 5/2005 Yung
2005/0114291 A1 5/2005 Becker-Szendy et al.
2005/0114701 A1 5/2005 Atkins et al.
2005/0117589 A1 6/2005 Douady et al.
2005/0122977 A1 6/2005 Lieberman
2005/0125195 A1 6/2005 Brendel
2005/0154837 A1 7/2005 Keohane et al.
2005/0165656 A1 7/2005 Frederick et al.
2005/0175013 A1 8/2005 Le Pennec et al.
2005/0187866 A1 8/2005 Lee
2005/0188220 A1 8/2005 Nilsson et al.
2005/0188423 A1 8/2005 Motsinger et al.
2005/0189501 A1 9/2005 Sato et al.
2005/0198234 A1 9/2005 Leib et al.
2005/0198310 A1 9/2005 Kim et al.
2005/0213587 A1 9/2005 Cho et al.
2005/0234928 A1 10/2005 Shkvarchuk et al.
2005/0240664 A1 10/2005 Chen et al.
2005/0246393 A1 11/2005 Coates et al.
2005/0256806 A1 11/2005 Tien et al.
2005/0262238 A1 11/2005 Reeves et al.
2005/0277430 A1 12/2005 Meisi
2005/0289109 A1 12/2005 Arrouye et al.
2005/0289111 A1 12/2005 Tribble et al.
2006/0010502 A1 1/2006 Mimatsu et al.
2006/0031374 A1 2/2006 Lu et al.
2006/0031520 A1 2/2006 Bedekar et al.
2006/0045096 A1 3/2006 Farmer et al.
2006/0047785 A1 3/2006 Wang et al.
2006/0059267 A1 3/2006 Cugi et al.
2006/0075475 A1 4/2006 Boulos et al.
2006/0077902 A1 4/2006 Kannan et al.
2006/0080353 A1 4/2006 Miloushev et al.
2006/0095573 A1 5/2006 Carle
2006/0106882 A1 5/2006 Douceur et al.
2006/0112151 A1 5/2006 Manley et al.
2006/0112176 A1 5/2006 Liu et al.
2006/0112272 A1 5/2006 Morioka et al.
2006/0112367 A1 5/2006 Harris
2006/0123062 A1 6/2006 Bobbitt et al.
2006/0129684 A1 6/2006 Datta
2006/0135198 A1 6/2006 Lee
2006/0140193 A1 6/2006 Kakani et al.
2006/0153201 A1 7/2006 Hepper et al.
2006/0156416 A1 7/2006 Huotari et al.
2006/0161577 A1 7/2006 Kulkarni et al.
2006/0167838 A1 7/2006 Lacapra
2006/0171365 A1 8/2006 Borella
2006/0179261 A1 8/2006 Rajan
2006/0184589 A1 8/2006 Lees et al.
2006/0190496 A1 8/2006 Tsunoda
2006/0200470 A1 9/2006 Lacapra et al.
2006/0209853 A1 9/2006 Hidaka et al.
2006/0212746 A1 9/2006 Amegadzie et al.
2006/0224687 A1 10/2006 Popkin et al.
2006/0230148 A1 10/2006 Forecast et al.
2006/0230265 A1 10/2006 Krishna
2006/0233106 A1 10/2006 Achlioptas et al.
2006/0242179 A1 10/2006 Chen et al.
2006/0242300 A1 10/2006 Yumoto et al.
2006/0259320 A1 11/2006 LaSalle et al.
2006/0259949 A1 11/2006 Schaefer et al.
2006/0268692 A1 11/2006 Wright et al.
2006/0271598 A1 11/2006 Wong et al.
2006/0277225 A1 12/2006 Mark et al.
2006/0282442 A1 12/2006 Lennon et al.
2006/0282461 A1 12/2006 Marinescu
2006/0282471 A1 12/2006 Mark et al.
2006/0288413 A1 12/2006 Kubota
2007/0005807 A1 1/2007 Wong
2007/0006293 A1 1/2007 Balakrishnan et al.
2007/0016613 A1 1/2007 Foresti et al.
2007/0016662 A1 1/2007 Desai et al.
2007/0024919 A1 2/2007 Wong et al.
2007/0027929 A1 2/2007 Whelan
2007/0027935 A1 2/2007 Haselton et al.
2007/0028068 A1 2/2007 Golding et al.
2007/0058670 A1 3/2007 Konduru et al.
2007/0064661 A1 3/2007 Sood et al.
2007/0083646 A1 4/2007 Miller et al.
2007/0088702 A1 4/2007 Fridella et al.
2007/0088822 A1 4/2007 Coile et al.
2007/0106796 A1 5/2007 Kudo et al.
2007/0107048 A1 5/2007 Halls et al.
2007/0118879 A1 5/2007 Yeun
2007/0124502 A1 5/2007 Li
2007/0124806 A1 5/2007 Shulman et al.
2007/0130255 A1 6/2007 Wolovitz et al.
2007/0136308 A1 6/2007 Tsirigotis et al.
2007/0136312 A1 6/2007 Shulman et al.
2007/0162891 A1 7/2007 Burner et al.
2007/0168320 A1 7/2007 Borthakur et al.
2007/0174491 A1 7/2007 Still et al.
2007/0208748 A1 9/2007 Li
2007/0209075 A1 9/2007 Coffman

(56) References Cited

U.S. PATENT DOCUMENTS

2007/0214503 A1 9/2007 Shulman et al.
2007/0220598 A1 9/2007 Salowey et al.
2007/0226331 A1 9/2007 Srinivasan et al.
2007/0233809 A1 10/2007 Brownell et al.
2007/0233826 A1 10/2007 Tindal et al.
2007/0297410 A1 12/2007 Yoon et al.
2007/0297551 A1 12/2007 Choi
2008/0004022 A1 1/2008 Johannesson et al.
2008/0010372 A1 1/2008 Khedouri et al.
2008/0022059 A1 1/2008 Zimmerer et al.
2008/0025297 A1 1/2008 Kashyap
2008/0034136 A1 2/2008 Ulenas
2008/0046432 A1 2/2008 Anderson et al.
2008/0070575 A1 3/2008 Claussen et al.
2008/0072303 A1 3/2008 Syed
2008/0104443 A1 5/2008 Akutsu et al.
2008/0120370 A1 5/2008 Chan et al.
2008/0133518 A1 6/2008 Kapoor et al.
2008/0134311 A1 6/2008 Medvinsky et al.
2008/0137659 A1 6/2008 Levy-Abegnoli et al.
2008/0148340 A1 6/2008 Powell et al.
2008/0159145 A1 7/2008 Muthukrishnan et al.
2008/0178278 A1 7/2008 Grinstein et al.
2008/0201599 A1 8/2008 Ferraiolo et al.
2008/0205415 A1 8/2008 Morales
2008/0205613 A1 8/2008 Lopez
2008/0208933 A1 8/2008 Lyon
2008/0209073 A1 8/2008 Tang
2008/0222223 A1 9/2008 Srinivasan et al.
2008/0222646 A1 9/2008 Sigal et al.
2008/0225710 A1 9/2008 Raja et al.
2008/0229415 A1 9/2008 Kapoor et al.
2008/0243769 A1 10/2008 Arbour et al.
2008/0253395 A1 10/2008 Pandya
2008/0256224 A1 10/2008 Kaji et al.
2008/0270578 A1 10/2008 Zhang et al.
2008/0271132 A1 10/2008 Jokela et al.
2008/0275843 A1 11/2008 Lal
2008/0282047 A1 11/2008 Arakawa et al.
2008/0288661 A1 11/2008 Galles
2008/0301760 A1 12/2008 Lim
2008/0304457 A1 12/2008 Thubert et al.
2008/0320093 A1 12/2008 Thorne
2009/0007162 A1 1/2009 Sheehan
2009/0028337 A1 1/2009 Balabine et al.
2009/0037975 A1 2/2009 Ishikawa et al.
2009/0041230 A1 2/2009 Williams
2009/0049230 A1 2/2009 Pandya
2009/0055607 A1 2/2009 Schack et al.
2009/0070617 A1 3/2009 Arimilli et al.
2009/0077097 A1 3/2009 Lacapra et al.
2009/0077619 A1 3/2009 Boyce
2009/0089344 A1 4/2009 Brown et al.
2009/0094252 A1 4/2009 Wong et al.
2009/0094610 A1 4/2009 Sukirya
2009/0100518 A1 4/2009 Overcash
2009/0103524 A1 4/2009 Mantripragada
2009/0106255 A1 4/2009 Lacapra et al.
2009/0106263 A1 4/2009 Khalid et al.
2009/0119504 A1 5/2009 van Os et al.
2009/0125496 A1 5/2009 Wexler et al.
2009/0125532 A1 5/2009 Wexler et al.
2009/0125625 A1 5/2009 Shim et al.
2009/0125955 A1 5/2009 DeLorme
2009/0132616 A1 5/2009 Winter et al.
2009/0138749 A1 5/2009 Moll et al.
2009/0141891 A1 6/2009 Boyen et al.
2009/0187649 A1 7/2009 Migault et al. ... H04L 29/12066 709/223
2009/0196282 A1 8/2009 Fellman et al.
2009/0204649 A1 8/2009 Wong et al.
2009/0204650 A1 8/2009 Wong et al.
2009/0204705 A1 8/2009 Marinov et al.
2009/0210431 A1 8/2009 Marinkovic et al.
2009/0228956 A1 9/2009 He et al.
2009/0254592 A1 10/2009 Marinov et al.
2009/0265396 A1 10/2009 Ram et al.
2009/0271865 A1 10/2009 Jiang
2009/0287935 A1 11/2009 Aull et al.
2009/0296624 A1 12/2009 Ryu et al.
2009/0300161 A1 12/2009 Pruitt et al.
2009/0300407 A1 12/2009 Kamath et al.
2010/0011434 A1 1/2010 Kay
2010/0017846 A1 1/2010 Huang et al.
2010/0023582 A1 1/2010 Pedersen et al.
2010/0034381 A1* 2/2010 Trace et al. ..... 380/255
2010/0036959 A1 2/2010 Trace et al.
2010/0061380 A1 3/2010 Barach et al.
2010/0064001 A1 3/2010 Daily
2010/0071048 A1 3/2010 Novak et al.
2010/0077462 A1 3/2010 Joffe et al.
2010/0115236 A1 5/2010 Bataineh et al.
2010/0122091 A1 5/2010 Huang et al.
2010/0142382 A1 6/2010 Jungck et al.
2010/0150154 A1 6/2010 Viger et al.
2010/0161774 A1* 6/2010 Huang et al. ..... 709/221
2010/0165877 A1 7/2010 Shukla et al.
2010/0179984 A1 7/2010 Sebastian
2010/0211547 A1 8/2010 Kamei et al.
2010/0217890 A1 8/2010 Nice et al.
2010/0228813 A1 9/2010 Suzuki et al.
2010/0242092 A1 9/2010 Harris et al.
2010/0251330 A1 9/2010 Kroeselberg et al.
2010/0274885 A1 10/2010 Yoo et al.
2010/0322250 A1 12/2010 Shetty et al.
2010/0325264 A1 12/2010 Crowder et al.
2010/0325277 A1 12/2010 Muthiah et al.
2011/0038377 A1 2/2011 Haddad
2011/0040889 A1 2/2011 Garrett et al.
2011/0047620 A1 2/2011 Mahaffey et al.
2011/0055921 A1 3/2011 Narayanaswamy et al.
2011/0066718 A1 3/2011 Susai et al.
2011/0066736 A1 3/2011 Mitchell et al.
2011/0087696 A1 4/2011 Lacapra
2011/0153822 A1 6/2011 Rajan et al.
2011/0154132 A1 6/2011 Aybay
2011/0154443 A1 6/2011 Thakur et al.
2011/0173295 A1 7/2011 Bakke et al.
2011/0184733 A1 7/2011 Yu et al.
2011/0208714 A1 8/2011 Soukal et al.
2011/0211553 A1 9/2011 Haddad
2011/0246800 A1 10/2011 Accpadi et al.
2011/0273984 A1 11/2011 Hsu et al.
2011/0282997 A1 11/2011 Prince et al.
2011/0283018 A1 11/2011 Levine et al.
2011/0292857 A1 12/2011 Sarikaya et al.
2011/0295924 A1 12/2011 Morris
2011/0307629 A1 12/2011 Haddad
2011/0321122 A1 12/2011 Mwangi et al.
2012/0005372 A1 1/2012 Sarikaya et al.
2012/0016994 A1 1/2012 Nakamura et al.
2012/0039341 A1 2/2012 Latif et al.
2012/0041965 A1 2/2012 Vasquez et al.
2012/0047571 A1 2/2012 Duncan et al.
2012/0054497 A1 3/2012 Korhonen
2012/0059934 A1 3/2012 Rafiq et al.
2012/0063314 A1 3/2012 Pignataro et al.
2012/0066489 A1 3/2012 Ozaki et al.
2012/0071131 A1 3/2012 Zisapel et al.
2012/0101952 A1 4/2012 Raleigh et al.
2012/0110210 A1 5/2012 Huang et al.
2012/0117379 A1 5/2012 Thornewell et al.
2012/0174217 A1 7/2012 Ormazabal
2012/0191847 A1 7/2012 Nas et al.
2012/0259998 A1 10/2012 Kaufman
2012/0284296 A1 11/2012 Arifuddin et al.
2012/0311153 A1 12/2012 Morgan
2012/0317266 A1 12/2012 Abbott
2013/0007870 A1 1/2013 Devarajan et al.
2013/0029726 A1 1/2013 Berionne et al.
2013/0091002 A1 4/2013 Christie et al.
2013/0100815 A1 4/2013 Kakadia et al.
2013/0103805 A1 4/2013 Lyon
2013/0110939 A1 5/2013 Yang et al.

(56) References Cited

U.S. PATENT DOCUMENTS

| | | | |
|---|---|---|---|
| 2013/0120168 | A1 | 5/2013 | Kumar et al. |
| 2013/0151725 | A1 | 6/2013 | Baginski et al. |
| 2013/0166715 | A1 | 6/2013 | Yuan et al. |
| 2013/0198322 | A1 | 8/2013 | Oran et al. |
| 2013/0201999 | A1 | 8/2013 | Savolainen et al. |
| 2013/0205035 | A1 | 8/2013 | Chen |
| 2013/0205040 | A1 | 8/2013 | Naor et al. |
| 2013/0335010 | A1 | 12/2013 | Wu et al. |
| 2013/0336122 | A1 | 12/2013 | Barush et al. |
| 2013/0340079 | A1 | 12/2013 | Gottlieb |
| 2014/0025823 | A1 | 1/2014 | Szabo et al. |
| 2014/0040478 | A1 | 2/2014 | Hsu et al. |
| 2014/0095661 | A1 | 4/2014 | Knowles et al. |
| 2014/0269484 | A1 | 9/2014 | Dankberg et al. |
| 2014/0317404 | A1 | 10/2014 | Carlson et al. |

FOREIGN PATENT DOCUMENTS

| | | | |
|---|---|---|---|
| CA | 2512312 | A1 | 7/2004 |
| EP | 0 605 088 | | 7/1994 |
| EP | 0 738 970 | | 10/1996 |
| EP | 0744850 | A2 | 11/1996 |
| EP | 1 081 918 | | 3/2001 |
| EP | 2 244 418 | | 10/2010 |
| GB | 2 448 071 | | 10/2008 |
| JP | 63010250 | A | 1/1988 |
| JP | 06-205006 | | 7/1994 |
| JP | 06-332782 | | 12/1994 |
| JP | 8021924 | | 3/1996 |
| JP | 08-328760 | | 12/1996 |
| JP | 08-339355 | | 12/1996 |
| JP | 9016510 | A | 1/1997 |
| JP | 11282741 | A | 10/1999 |
| JP | 2000183935 | | 6/2000 |
| JP | 2005-010913 | | 1/2005 |
| JP | 2008-257738 | A | 10/2008 |
| JP | 2009-124113 | | 6/2009 |
| JP | 2011-188071 | | 9/2011 |
| JP | 2011-238263 | | 11/2011 |
| NZ | 566291 | | 12/2008 |
| WO | WO 91/14326 | | 9/1991 |
| WO | WO 95/05712 | | 2/1995 |
| WO | WO 97/09805 | | 3/1997 |
| WO | WO 97/45800 | | 12/1997 |
| WO | WO 99/05829 | | 2/1999 |
| WO | WO 99/06913 | | 2/1999 |
| WO | WO 99/10858 | | 3/1999 |
| WO | WO 99/39373 | | 8/1999 |
| WO | WO 99/64967 | | 12/1999 |
| WO | WO 00/04422 | | 1/2000 |
| WO | WO 00/04458 | | 1/2000 |
| WO | WO 00/58870 | | 10/2000 |
| WO | WO 02/39696 | | 5/2002 |
| WO | WO 02/056181 | A2 | 7/2002 |
| WO | WO 2004/061605 | A2 | 7/2004 |
| WO | WO 2006/091040 | | 8/2006 |
| WO | WO 2009/052668 | | 10/2007 |
| WO | WO 2008/130983 | | 10/2008 |
| WO | WO 2008/147973 | A2 | 12/2008 |

OTHER PUBLICATIONS

Arends R., et al., "DNS Security Introduction and Requirements", Network Working Group, RFC 4033, Mar. 2005, pp. 1-20.

Arends R., et al., "Protocol Modifications for the DNS Security Extensions", Network Working Group, RFC 4035, Mar. 2005, pp. 1-50.

Arends R., et al., "Resource Records for the DNS Security Extensions", Network Working Group, RFC 4034, Mar. 2005, pp. 1-28.

Forrester Research, Inc., "DNSSEC Ready for Prime Time", Forrester Research, Inc. Cambridge, MA (Jul. 2010).

Thomson, et al., "DNS Extensions to Support IP Version 6", The Internet Society (Oct. 2003).

Wikipedia, "List of DNS record types", retrieved from Internet URL: http://en.wikipedia.org/wiki/List_of_DNS_record_types (Jun. 2010).

Wikipedia, "IPv6", retrieved from Internet URL: http://en.wikipedia.org/wiki/IPv6 (Jun. 2010).

Wikipedia, "Domain Name System Security Extensions", retrieved from Internet URL: http://en.wikipedia.org/wiki/DNSSEC (Jun. 2010).

Dan Kaminsky, (slideshow presentation) "Black Ops of Fundamental Defense: Introducing the Domain Key Infrastructure", retrieved from Internet URL: http://www.slideshare.net/RecursionVentures/dki-2, (Aug. 2010).

Bau et al., "A Security Evaluation of DNSSEC with NSEC3," Mar. 2, 2010; updated version corrects and supersedes a paper in the NDSS' 10 proceedings, pp. 1-17.

"BIG-IP® Global Traffic Manager," <http://www.f5.com/products/bigip/product-modules/global-traffic-manager.html>, last accessed Jul. 6, 2010, 2 pages.

"BIG-IP® Global Traffic Manager™ and BIG-IP Link Controller™: Implementations,".

"DNSSEC Functional Spec," TMOSDnsSECFS<TMOS<TWiki, last accessed on Mar. 31, 2010, p. 1-10.

"DNSX; DNSX Secure Signer; DNSSEC Management Solution," <http://www.xelerance.com/dnssec>. pp. 1-9.

"F5 and Infoblox Provide Customers with Complete DNS Security Solution," <http://www.f5.com/news-press-events/press/2010/20100301.html>, Mar. 1, 2010, 2 pages, F5 Networks, Inc. Seattle and Santa Clara, California.

"F5 Solutions Enable Government Organizations to Meet 2009 DNSSEC Compliance,"<http://www.f5.com/news-press-events/press/2009/20091207.html>, Dec. 7, 2009, 2 pages, F5 Networks, Inc., Seattle, California.

Higgins, Kelly Jackson, "Internet Infrastructure Reaches Long-Awaited Security Milestone," Tech Center: Security Services, <http://www.darkreading.com/securityservices/securtiy/management/showArticle.jhtml?article>, Jul. 28, 2010. pp. 1-4.

Macvittie, Lori, "It's DNSSEC Not DNSSUX," DevCentral>Weblogs, <http://devcentral.f5.com/weblogs/macvittie/archive/2009/11/18/itrsquos-dnssec-notdnssux.aspx>, posted on Nov. 18, 2009, accessed on Jul. 6, 2010, pp. 3-7.

Meyer et al., "F5 and Infoblox DNS Integrated Architecture: Offering a Complete Scalable, Secure DNS Solution, "F5 Technical Brief, Feb. 2, 2010, 18 pages, URL: http://web.archive.prg/web/20100326145019/http://www.f5.com/pdf/white-papers/infoblox-wp.pdf.

Weiler et al., "Minimally Covering NSEC Records and DNSSEC On-line Signing, "Network Working Group, RFC 4470, Apr. 2006, 8 pages, The Internet Society.

"Who is Xelerance," <http://www.xelerance.com>, slides 1-6 (2007).

"A Process for Selective Routing of Servlet Content to Transcoding Modules," Research Disclosure 422124, Jun. 1999, pp. 889-890, IBM Corporation.

"A Storage Architecture Guide," Second Edition, 2001, Auspex Systems, Inc., www.auspex.com, last accessed on Dec. 30, 2002.

"BIG-IP® Global Traffic Manager," <http://www.f5.com/products/big-ip/product-modules/global-traffic-manager.html>, last accessed Jul. 6, 2010, 2 pages.

"CSA Persistent File System Technology," A White Paper, Jan. 1, 1999, p. 1-3, http://www.cosoa.com/white_papers/pfs.php, Colorado Software Architecture, Inc.

"Detail Requirement Report: RQ-GTM-0000024," <http://fpweb/fptopic.asp?REQ=RQ-GTM-0000024>, F5 Networks, Inc., 1999, printed Mar. 31, 2010, 2 pages.

"Detail Requirement Report: RQ-GTM-0000028," <http://fpweb/fptopic.asp?REQ=RQ-GTM-0000028>, F5 Networks, Inc., 1999, printed Mar. 31, 2010, 2 pages.

"Diameter MBLB Support Phase 2: Generic Message Based Load Balancing (GMBLB)", last accessed Mar. 29, 2010, pp. 1-10, (http://peterpan.f5net.com/twiki/bin/view/TMOS/TMOSDiameterMBLB).

"Distributed File System: A Logical View of Physical Storage: White Paper," 1999, Microsoft Corp., www.microsoft.com, <http://

(56) References Cited

OTHER PUBLICATIONS www.eu.microsoft.com/TechNet/prodtechnol/windows2000serv/maintain/DFSnt95>, pp. 1-26, last accessed on Dec. 20, 2002.
"DNSSEC Functional Spec," TMOSDnsSECFS<Tmos<TWiki, last accessed on Mar. 31, 2010, pp. 1-10.
"DNSX; DNSX Secure Signer; DNSSEC Management Solution," <http://www.xelerance.com/dnssec>.pp. 1-9, Aug. 2009.
"F5 Solutions Enable Government Organizations to Meet 2009 DNSSEC Compliance," .<http://www.f5.com/news-press-events/press/2009/20091207.html>, Dec. 7, 2009, 2 pages, F5 Networks, Inc., Seattle, California.
"Market Research & Releases, CMPP PoC documentation", last accessed Mar. 29, 2010, (http://mainstreet/sites/PD/Teams/ProdMgmt/MarketResearch/Universal).
"Market Research & Releases, Solstice Diameter Requirements", last accessed Mar. 29, 2010, (http://mainstreet/sites/PD/Teams/Prod/Mgmt/MarketResearch/Unisversal).
"NERSC Tutorials: I/O on the Cray T3E, 'Chapter 8, Disk Striping'," National Energy Research Scientific Computing Center (NERSC), http://hpcfnersc.gov, last accessed on Dec. 27, 2002.
"Respond to Server Depending on TCP::Client_Port", DevCentral Forums iRules, pp. 1-6, last accessed Mar. 26, 2010, (http://devcentral.f5.com/Default/aspx?tabid=53&forumid=5&tpage=1&v).
"Scaling Next Generation Web Infrastructure with Content-Intelligent Switching: White Paper," Apr. 2000, p. 1-9 Alteon Web Systems, Inc.
"Secure64 DNS Signer", <http://www.secure64.com>, Data sheet, Jun. 22, 2011, V.3.1., 2 pages.
"Servlet/Applet/HTML Authentication Process With Single Sign-On," Research Disclosure 429128, Jan. 2000, pp. 163-164, IBM Corporation.
"The AFS File System in Distributed Computing Environment," www.transarc.ibm.com/Library/whitepapers/AFS/afsoverview.html, last accessed on Dec. 20, 2002.
"Traffic Surges; Surge Queue; Netscaler Defense," 2005, PowerPoint Presentation, slides 1-12, Citrix Systems, Inc.
"UDDI Overview", Sep. 6, 2000, pp. 1-21, uddi.org, (http://www.uddi.org/).
"UDDI Technical White Paper," Sep. 6, 2000, pp. 1-12, uddi-org, (http://www.uddi.org/).
"UDDI Version 3.0.1", UDDI Spec Technical Committee Specification, Oct. 14, 2003, pp. 1-383, uddi.org, (http://www.uddi.org/).
"Veritas SANPoint Foundation Suite(tm) and SANPoint Foundation Suite(tm) HA: New Veritas Volume Management and File System Technology for Cluster Environments," Sep. 2001, Veritas Software Corp.
"Who is Xelerance," <http://www.xelerance.com>, slides 1-6.
"Windows Clustering Technologies —An Overview," Nov. 2001, Microsoft Corp., www.microsoft.com, last accessed on Dec. 30, 2002.
"Windows Server 2003 Kerberos Extensions," Microsoft TechNet, 2003 (Updated Jul. 31, 2004), http://technet.microsoft.com/en-us/library/cc738207, Microsoft Corporation.
Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.
Aguilera, Marcos K. et al., "Improving recoverability in multi-tier storage systems," International Conference on Dependable Systems and Networks (DSN-2007), Jun. 2007, 10 pages, Edinburgh, Scotland.
Anderson et al., "Serverless Network File System," in the 15th Symposium on Operating Systems Principles, Dec. 1995, Association for Computing Machinery, Inc. (18 pages).
Anderson, Darrell C. et al., "Interposed Request Routing for Scalable Network Storage," ACM Transactions on Computer Systems 20(1): (Feb. 2002), pp. 1-24.
Anonymous, "How DFS Works: Remote File Systems," Distributed File System (DFS) Technical Reference, retrieved from the Internet on Feb. 13, 2009: URL<:http://technetmicrosoft.com/en-us/library/cc782417WS.10,printer).aspx> (Mar. 2003).
Apple, Inc., "Mac OS X Tiger Keynote Intro. Part 2," Jun. 2004, www.youtube.com <http://www.youtube.com/watch?v=zSBJwEmRJbY>, p. 1.
Apple, Inc., "Tiger Developer Overview Series: Working with Spotlight," Nov. 23, 2004, www.apple.com using www.archive.org <http://web.archive.org/web/20041123005335/developer.apple.com/macosx/tiger/spotlight.html>, pp. 1-6.
Arends et al., "DNS Security Introduction and Requirements", Network Working Group, RFC 4033, Mar. 2005, pp. 1-20.
Arends et al., "Protocol Modifications for the DNS Security Extensions," Network Working Group, RFC 4035, Mar. 1, 2005, 54 pages, The Internet Society.
Arends et al., "Resource Records for the DNS Security Extensions", Network Working Group, RFC 4034, Mar. 2005, pp. 1-28.
Aura T., "Cryptographically Generated Addresses (CGA)", Network Working Group, RFC 3972, Mar. 2005, pp. 1-21.
Baer, T., et al., "The Elements of Web Services" ADTmag.com, Dec. 1, 2002, pp. 1-6, (http://www.adtmag.com).
Bagnulo et al., "DNS 64: DNS extensions for Network Address Translation from IPv6 Clients to IPv4 Servers," Internet draft, Jul. 2010, pp. 1-31, IETF Trust.
Basney et al., "Credential Wallets: A Classification of Credential Repositories Highlighting MyProxy," Sep. 19-21, 2003, pp. 1-20, 31st Research Conference on Communication, Information and Internet Policy (TPRC 2003), Arlington, Virginia.
Bau et al., "A Security Evaluation of DNSEC with NSEC3," Mar. 2, 2010; updated version corrects and supersedes a paper in the NDSS' 10 proceedings, pp. 1-18.
BIG-IP® Access Policy Manager®: Implementations, Version 12.0, F5 Networks, Inc., 2015, pp. 1-108.
Blue Coat, "Technology Primer: CIFS Protocol Optimization," Blue Coat Systems Inc., 2007, pp. 1-3, (http://www.bluecoat.com).
Botzum, Keys, "Single Sign On—A Contrarian View," Aug. 6, 2001, pp. 1-8, Open Group Website, http://www.opengroup.org/security/topics.htm.
Cabrera et al., "Swift: A Storage Architecture for Large Objects," In Proceedings of the-Eleventh IEEE Symposium on Mass Storage Systems, Oct. 1991, pp. 123-128.
Cabrera et al., "Swift: Using Distributed Disk Striping to Provide High I/O Data Rates," Fall 1991, pp. 405-436, vol. 4, No. 4, Computing Systems.
Cabrera et al., "Using Data Striping in a Local Area Network," 1992, technical report No. UCSC-CRL-92-09 of the Computer & Information Sciences Department of University of California at Santa Cruz.
Callaghan et al., "NFS Version 3 Protocol Specifications" (RFC 1813), Jun. 1995, The Internet Engineering Task Force (IETN), www.ietf.org, last accessed on Dec. 30, 2002.
Carns et al., "PVFS: A Parallel File System for Linux Clusters," in Proceedings of the Extreme Linux Track: 4th Annual Linux Showcase and Conference, Oct. 2000, pp. 317-327, Atlanta, Georgia, USENIX Association.
Cavale, M. R., "Introducing Microsoft Cluster Service (MSCS) in the Windows Server 2003", Microsoft Corporation, Nov. 2002.
Crescendo Networks, "Application Layer Processing (ALP)," 2003-2009, pp. 168-186, Chapter 9, CN-5000E/5500E, Foxit Software Company.
Dan Kaminsky, (slideshow presentation) "Black Ops of Fundamental Defense: Introducing the Domain Key Infrastructure", retrieved from Internet URL: http://www.slideshare.net/RecursionVentures/dki-2, (slides 1-116) (Aug. 2010).
English Translation of Notification of Reason(s) for Refusal for JP 2002-556371 (Dispatch Date: Jan. 22, 2007).
F5 Networks Inc., "3-DNS® Reference Guide, version 4.5", F5 Networks Inc., Sep. 2002, pp. 2-1-2-8, 3-1-3-12, 5-1-5-24, Seattle, Washington.
F5 Networks Inc., "Big-IP® Reference Guide, version 4.5", F5 Networks Inc., Sep. 2002, pp. 11-1-11-32, Seattle, Washington.
F5 Networks Inc., "Case Information Log for 'Issues with BoNY upgrade to 4.3'", as early as Feb. 2008.

(56) References Cited

OTHER PUBLICATIONS

F5 Networks Inc., "Configuration Guide for Local Traffic Management", F5 Networks Inc., Jan. 2006, version 9.2.2, 406 pgs.
F5 Networks Inc., "Deploying the BIG-IP LTM for Diameter Traffic Management" F5® Deployment Guide, Publication date Sep. 2010, Version 1.2, pgs. 1-19.
F5 Networks Inc., "F5 Diameter RM", Powerpoint document, Jul. 16, 2009, pp. 1-7.
F5 Networks Inc., "F5 WANJet CIFS Acceleration", White Paper, F5 Networks Inc., Mar. 2006, pp. 1-5, Seattle, Washington.
F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5products/3dns/relatedMaterials/UsingF5.html).
F5 Networks Inc., "Using F5's 3-DNS Controller to Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).
F5 Networks, Inc., "BIG-IP ASM 11.2.0", Release Notes, Sep. 19, 2012, Version 11.2.0, F5 Networks, Inc.
F5 Networks, Inc., "BIG-IP Controller with Exclusive OneConnect Content Switching Feature Provides a Breakthrough System for Maximizing Server and Network Performance," Press Release, May 8, 2001, 2 pages, Las Vegas, Nevada.
F5 Networks, Inc., "BIG-IP Systems: Getting Started Guide," Manual 0300-00, Feb. 4, 2010, pp. 1-102, version 10.1, F5 Networks, Inc.
F5 Networks, Inc., "BIG-IP® Access Policy Manager®: Application Access," version 12.1, published May 9, 2016 (66 pages).
F5 Networks, Inc., "BIG-IP® Access Policy Manager®: Authentication and Single Sign-On," version 12.1, published May 9, 2016 (332 pages).
F5 Networks, Inc., "BIG-IP® Access Policy Manager®: Implementations," version 12.1, published May 9, 2016 (168 pages).
F5 Networks, Inc., "BIG-IP® Access Policy Manager®: Network Access," version 12.1, published May 9, 2016 (108 pages).
F5 Networks, Inc., "BIG-IP® Access Policy Manager®: Portal Access," version 12.1, published May 9, 2016 (82 pages).
F5 Networks, Inc., "BIG-IP® Access Policy Manager®: Secure Web Gateway", version 12.1, published May 9, 2016 (180 pages).
F5 Networks, Inc., "BIG-IP® Application Security Manager™: Getting Started Guide", Version 11.2, May 7, 2012, F5 Networks, Inc.
F5 Networks, Inc., "BIG-IP® Application Security Manager™: Implementations", Version 11.2, May 7, 2012, F5 Networks, Inc.
F5 Networks, Inc., "BIG-IP® TMOS®: Implementations", Manual, May 5, 2015, Version 11.2, F5 Networks, Inc.
F5 Networks, Inc., "Configuration Guide for BIG-IP® Application Security Manager™", Manual, May 7, 2012, Version 11.2, F5 Networks, Inc.
F5 Networks, Inc., "F5 TMOS Operations Guide", Manual, Mar. 5, 2015, F5 Networks, Inc.
F5 Networks, Inc., "Release Note: BIG-IP APM 12.1.0," published Jun. 6, 2016 (13 pages).
Fajardo V., "Open Diameter Software Architecture," Jun. 25, 2004, pp. 1-6, Version 1.0.7.
Fan et al., "Summary Cache: A Scalable Wide-Area Protocol", Computer Communications Review, Association Machinery, New York, USA, Oct. 1998, vol. 28, Web Cache Sharing for Computing No. 4, pp. 254-265.
Farley, M., "Building Storage Networks," Jan. 2000, McGraw Hill, ISBN 0072120509.
Fielding et al., "Hypertext Transfer Protocol—HTTP/1.1," Network Working Group, RFC: 2068, Jan. 1997, pp. 1-162.
Fielding et al., "Hypertext Transfer Protocol—HTTP/1.1," Network Working Group, RFC: 2616, Jun. 1999, pp. 1-176, The Internet Society.
Floyd et al., "Random Early Detection Gateways for Congestion Avoidance," Aug. 1993, pp. 1-22, IEEE/ACM Transactions on Networking, California.
Forrester Research, Inc., "DNSSEC Ready for Prime Time", Forrester Research, Inc. Cambridge, MA, 23 pages (Jul. 2010).
Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997.
Gibson et al., "NASD Scalable Storage Systems," Jun. 1999, USENIX99, Extreme Linux Workshop, Monterey, California.
Gupta et al., "Algorithms for Packet Classification", Computer Systems Laboratory, Stanford University, CA, Mar./Apr. 2001, pp. 1-29.
Hagino J., et al., "An IPv6-to-IPv4 Transport Relay Translator", Network Working Group, RFC 3142, Jun. 2001, pp. 1-11.
Harrison, C., May 19, 2008 response to Communication pursuant to Article 96(2) EPC dated Nov. 9, 2007 in corresponding European patent application No. 02718824.2.
Hartman, J., "The Zebra Striped Network File System," 1994, Ph.D. dissertation submitted in the Graduate Division of the University of California at Berkeley.
Haskin et al., "The Tiger Shark File System," 1996, in proceedings of IEEE, Spring Compcon, Santa Clara, CA, www.research.ibm.com, last accessed on Dec. 30, 2002.
Heinz G., "Priorities in Stream Transmission Control Protocol (SCTP) Multistreaming", Thesis submitted to the Faculty of the University of Delaware, Spring 2003, pp. 1-35.
Higgins, Kelly Jackson, "Internet Infrastructure Reaches Long-Awaited Security Milestone," Tech Center: Security Services, <http//www.darkreading.com/securityservices/security/management/showArticle.jhtml?article>, Jul. 28, 2010. pp. 1-4.
Hochmuth, Phil, "F5, CacheFlow pump up content-delivery lines," Network World Fusion, May 4, 2001, 1 page, Las Vegas, Nevada.
Howarth, Fran, "Investing in security versus facing the consequences," White Paper by Bloor Research, Sep. 2010, pp. 1-15.
Hu, J., Final Office action dated Sep. 21, 2007 for related U.S. Appl. No. 10/336,784.
Hu, J., Office action dated Feb. 6, 2007 for related U.S. Appl. No. 10/336,784.
Hwang et al., "Designing SSI Clusters with Hierarchical Checkpointing and Single 1/0 Space," IEEE Concurrency, Jan.-Mar. 1999, pp. 60-69.
Ilvesmaki M., et al., "On the Capabilities of Application Level Traffic Measurements to Differentiate and Classify Internet Traffic", Presented in SPIE's International Symposium ITcom, Aug. 19-21, 2001, pp. 1-11, Denver, Colorado.
International Search Report and Written Opinion for International Patent Application No. PCT/US2011/058469 (dated May 30, 2012).
International Search Report and Written Opinion for PCT/US2011/054331, dated Mar. 13, 2012, 13 pages.
International Search Report for International Patent Application No. PCT/US2008/083117 (dated Jun. 23, 2009).
International Search Report for International Patent Application No. PCT/US2008/060449 (dated Apr. 9, 2008).
International Search Report for International Patent Application No. PCT/US2008/064677 (dated Sep. 6, 2009).
International Search Report for International Patent Application No. PCT/US02/00720, dated Mar. 19, 2003.
International Search Report for International Patent Application No. PCT/US2012/071648 (dated May 27, 2013).
International Search Report from International Application No. PCT/US03/41202, dated Sep. 15, 2005.
Internet Protocol,"Darpa Internet Program Protocol Specification", (RFC:791), Information Sciences Institute, University of Southern California, Sep. 1981, pp. 1-49.
Karamanolis et al., "An Architecture for Scalable and Manageable File Services," HPL-2001-173, Jul. 26, 2001. p. 1-14.
Katsurashima et al., "NAS Switch: A Novel CIFS Server Virtualization, Proceedings," 20th IEEE/11th NASA Goddard Conference on Mass Storage Systems and Technologies, 2003 (MSST 2003), Apr. 2003.
Kawamoto, D., "Amazon Files for Web Services Patent", CNET News.com, Jul. 28, 2005, pp. 1-2, last accessed May 4, 2006, (http://news.com).

(56) References Cited

OTHER PUBLICATIONS

Kimball, C.E. et al., "Automated Client-Side Integration of Distributed Application Servers," 13Th LISA Conf., 1999, pp. 275-282 of the Proceedings.
Klayman, J., response filed by Japanese associate to office action dated Jan. 22, 2007 in corresponding Japanese patent application No. 2002-556371.
Klayman, J., Nov. 13, 2008 e-mail to Japanese associate including instructions for response to office action dated May 26, 2008 in corresponding Japanese patent application No. 2002-556371.
Klayman, J., Jul. 18, 2007 e-mail to Japanese associate including instructions for response to office action dated Jan. 22, 2007 in corresponding Japanese patent application No. 2002-556371.
Kohl et al., "The Kerberos Network Authentication Service (V5)," RFC 1510, Sep. 1993. (http://www.ietf.org/rfc/rfc1510.txt?number=1510).
Korkuzas, V., Communication pursuant to Article 96(2) EPC dated Sep. 11, 2007 in corresponding European patent application No. 02718824.2-2201.
LaMonica M., "Infravio Spiffs Up Web Services Registry Idea", CNET News.com, May 11, 2004, pp. 1-2, last accessed Sep. 20, 2004, (http://www.news.com).
Laurie et al., "DNS Security (DNSSEC) Hashed Authenticated Denial of Existence," Network Working Group, RFC 5155, Feb. 2008, pp. 1-51.
Lelil, S., "Storage Technology News: AutoVirt adds tool to help data migration projects," Feb. 25, 2011, last accessed Mar. 17, 2011, <http://searchstorage.techtarget.com/news/article/0,289142,sid5_gci1527986,00.html >.
Long et al., "Swift/RAID: A distributed RAID System", Computing Systems, Summer 1994, vol. 7, pp. 333-359.
Mac Vittie, L., "Message-Based Load Balancing: Using F5 Solutions to Address the Challenges of Scaling Diameter, RADIUS, and Message-Oriented Protocols", F5 Technical Brief, 2005, pp. 1-9, F5 Networks Inc., Seattle, Washington.
MacVittie, Lori, "It's DNSSEC Not DNSSUX," DevCentral>Weblogs, <http://devcentral.f5.com/weblogs/macvittie/archive/2009/11/18/itrsquos-dnssec-not-dnssux.aspx>, posted on Nov. 18, 2009, accessed on Jul. 6, 2010, pp. 3-7.
MacVittie, Lori, "Message-Based Load Balancing," Technical Brief, Jan. 2010, pp. 1-9, F5 Networks, Inc.
Meyer et al., "F5 and Infoblox DNS Integrated Architecture: Offering a Complete Scalable, Secure DNS Solution," F5 Technical Brief, Feb. 2, 2010, 18 pages, URL: http://web.archive.prg/web/20100326145019/http://www.f5.com/pdf/white-papers/infoblox-wp.pdf.
Modiano E., "Scheduling Algorithms for Message Transmission Over a Satellite Broadcast System", MIT Lincoln Laboratory Advanced Network Group, Nov. 1997, pp. 1-7.
Nichols K., et al., "Definition of the Differentiated Services Field (DS Field) in the IPv4 and IPv6 Headers", (RFC:2474) Network Working Group, Dec. 1998, pp. 1-19, last accessed Oct. 8, 2012, (http://www.ietf.org/rfc/rfc2474.txt).
Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.
Norton et al., "CIFS Protocol Version CIFS-Spec 0.9," 2001, Storage Networking Industry Association (SNIA), www.snia.org, last accessed on Mar. 26, 2001.
Notice of Reasons for Rejection and Its English Translation for corresponding Japanese Patent Application No. 2014-550426 (Apr. 13, 2016) (3 pages).
Novotny et al., "An Online Credential Repository for the Grid: MyProxy," 2001, pp. 1-8.
Office Action for corresponding Chinese Application No. 201280070784.4 (dated Dec. 6, 2016) (15 pages).
Office Action for corresponding Taiwan Patent Application No. 101145417 (dated May 11, 2016) (11 pages).
Ott D., et al., "A Mechanism for TCP-Friendly Transport-level Protocol Coordination", USENIX Annual Technical Conference, 2002, University of North Carolina at Chapel Hill, pp. 1-12.
OWASP, "Testing for Cross site scripting", OWASP Testing Guide v2, Table of Contents, Feb. 24, 2011, pp. 1-5, (www.owasp.org/index.php/Testing_for_Cross_site_scripting).
Padmanabhan V., et al., "Using Predictive Prefetching to Improve World Wide Web Latency", SIGCOM, 1996, pp. 1-15.
Pashalidis et al., "A Taxonomy of Single Sign-On Systems," 2003, pp. 1-16, Royal Holloway, University of London, Egham Sunray, TW20, 0EX, United Kingdom.
Pashalidis et al., "Impostor: A Single Sign-On System for Use from Untrusted Devices," Global Telecommunications Conference, 2004, GLOBECOM '04, IEEE, Issue Date: Nov. 29-Dec. 3, 2004.Royal Holloway, University of London.
Patterson et al., "A case for redundant arrays of inexpensive disks (RAIFD)", Chicago, Illinois, Jun. 1-3, 1998, in Proceedings of ACM Sigmod conference on the Management of Data, pp. 109-116, Association for Computing Machinery, Inc., www.acm.org, last accessed on Dec. 20, 2002.
Pearson, P.K., "Fast Hashing of Variable-Length Text Strings," Comm. of the ACM, Jun. 1990, pp. 1-4, vol. 33, No. 6.
Peterson, M., "Introducing Storage Area Networks," Feb 1998, InfoStor, www.infostor.com, last accessed on Dec. 20, 2002.
Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org, last accessed on Dec. 20, 2002.
Response filed Jul. 6, 2007 to Office action dated Feb. 6, 2007 for related U.S. Appl. No. 10/336,784.
Response filed Mar. 20, 2008 to Final Office action dated Sep. 21, 2007 for U.S. Appl. No. 10/336,784.
Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000 (Mar. 26, 2000), pp. 864-873, XP010376176 ISBN: 0-7803-5880-5 p. 867, col. 2, last paragraph—p. 868, col. 1, paragraph 1.
Rosen E., et al., "MPLS Label Stack Encoding", (RFC:3032) Network Working Group, Jan. 2001, pp. 1-22, last accessed Oct. 8, 2012, (http://www.ietf.org/rfc/rfc3032.txt).
RSYNC, "Welcome to the RSYNC Web Pages," Retrieved from the Internet URL: http://samba.anu.edu.ut.rsync/. (Retrieved on Dec. 18, 2009).
Savage, et al., "AFRAID—A Frequently Redundant Array of Independent Disks," Jan. 22-26, 1996, pp. 1-13, USENIX Technical Conference, San Diego, California.
Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.
Schilit B., "Bootstrapping Location-Enhanced Web Services", University of Washington, Dec. 4, 2003, (http://www.cs.washington.edu/news/colloq.info.html).
Seeley R., "Can Infravio Technology Revive UDDI?", ADTmag.com, Oct. 22, 2003, last accessed Sep. 30, 2004, (http://www.adtmag.com).
Shohoud, Y., "Building XML Web Services with VB.NET and VB 6", Addison Wesley, 2002, pp. 1-14.
Silva, Peter, "DNSSEC: The Antidote to DNS Cache Poisoning and Other DNS Attacks," F5 Technical Brief, 2009, pp. 1-10.
Sleeper B., "The Evolution of UDDI" UDDI.org White Paper, The Stencil Group, Inc., Jul. 19, 2002, pp. 1-15, San Francisco, California.
Sleeper B., "Why UDDI Will Succeed, Quietly: Two Factors Push Web Services Forward", The Stencil Group, Inc., Apr. 2001, pp. 1-7, San Francisco, California.
Soltis et al., "The Design and Performance of a Shared Disk File System for IRIX," Mar. 23-26, 1998, pp. 1-17, Sixth NASA Goddard Space Flight Center Conference on Mass Storage and Technologies in cooperation with the Fifteenth IEEE Symposium on Mass Storage Systems, University of Minnesota.

(56) References Cited

OTHER PUBLICATIONS

Soltis et al., "The Global File System," Sep. 17-19, 1996, in Proceedings of the Fifth NASA Goddard Space Flight Center Conference on Mass Storage Systems and Technologies, College Park, Maryland.
Sommers F., "Whats New in UDDI 3.0—Part 1", Web Services Papers, Jan. 27, 2003, pp. 1-4, last accessed Mar. 31, 2004, (http://www.webservices.org/index.php/articleprint/871/-1/24).
Sommers F., "Whats New in UDDI 3.0—Part 2", Web Services Papers, Mar. 2, 2003, pp. 1-8, last accessed Nov. 1, 2007, (http://www.web.archive.org/web/20040620131006/).
Sommers F., "Whats New in UDDI 3.0—Part 3", Web Services Papers, Sep. 2, 2003, pp. 1-4, last accessed Mar. 31, 2007, (http://www.webservices.org/index.php/article/articleprint/894/-1/24/).
Sorenson, K.M., "Installation and Administration: Kimberlite Cluster Version 1.1.0, Rev. Dec. 2000," Mission Critical Linux, http://oss.missioncriticallinux.corn/kimberlite/kimberlite.pdf.
Stakutis, C., "Benefits of SAN-based file system sharing," Jul. 2000, pp. 1-4, InfoStor, www.infostor.com, last accessed on Dec. 30, 2002.
Tatipamula et al., "IPv6 Integration and Coexistence Strategies for Next-Generation Networks", IEEE Communications Magazine, Jan. 2004, pp. 88-96.
Thekkath et al., "Frangipani: A Scalable Distributed File System," in Proceedings of the 16th ACM Symposium on Operating Systems Principles, Oct. 1997, pp. 114, Association for Computing Machinery, Inc.
Thomson et al., "DNS Extensions to Support IP Version 6," The Internet Society, Network Working Group, RFC 3596, Oct. 2003, pp. 1-8.
Tulloch, Mitch, "Microsoft Encyclopedia of Security," 2003, pp. 218, 300-301, Microsoft Press, Redmond, Washington.
Uesugi, H., Nov. 26, 2008 amendment filed by Japanese associate in response to office action dated May 26, 2008 in corresponding Japanese patent application No. 2002-556371.
Uesugi, H., English translation of office action dated May 26, 2008 in corresponding Japanese patent application No. 2002-556371.
Uesugi, H., Jul. 15, 2008 letter from Japanese associate reporting office action dated May 26, 2008 in corresponding Japanese patent application No. 2002-556371.
Wallace, "Delegating Identity Using X.509 Certificates", IETF Trust, Jul. 29, 2015, 8 pgs.
Wang B., "Priority and Realtime Data Transfer Over the Best-Effort Internet", Dissertation Abstract, 2005, ScholarWorks@UMASS.
Weiler et al., "Minimally Covering NSEC Records and DNSSEC On-line Signing," Network Working Group, RFC 4470, Apr. 2006, 8 pages, The Internet Society.
Wikipedia, "Diameter (protocol)", pp. 1-11, last accessed Oct. 27, 2010, (http://en.wikipedia.org/wiki/Diameter_(protocol)).
Wikipedia, "Domain Name System Security Extensions," <http://en.wikipedia.org/wiki/DNSSEC>, accessed Jun. 3, 2010, pp. 1-20.
Wikipedia, "IPv6", <http://en.wikipedia.org/wiki/IPv6>, accessed Jun. 3, 2010, 20 pages.
Wikipedia, "List of DNS record types," <http://en.wikipedia.org/wiki/List_of_DNS_record_types>, Jun. 2010, pp. 1-6.
Wilkes, J., et al., "The HP AutoRAID Hierarchical Storage System," Feb. 1996, vol. 14, No. 1, ACM Transactions on Computer Systems.
Williams et al., "Forwarding Authentication," The Ultimate Windows Server 2003 System Administrator's Guide, 2003, 2 pages, Figure 10.7, Addison-Wesley Professional, Boston, Massachusetts.
Woo T.Y.C., "A Modular Approach to Packet Classification: Algorithms and Results", Bell Laboratories, Lucent Technologies, Mar. 2000, pp. 1-10.
Xelerance, "DNSX; DNSX Secure Signer; DNSSEC Management Solution," <http://www.xelerance.com/dnssec>.pp. 1-9, Aug. 2009.
Zayas, E., "AFS-3 Programmer's Reference: Architectural Overview," Transarc Corp., version 1.0 of Sep. 2, 1991, doc. No. FS-00-D160.
Peter Silva, Securing Web Presence with DNSSEC, ISSA Preeminent Trusted Global Information Security Community, ISSA Journal, Mar. 2010), pp. 32-36.*
Carpenter, B., "Transmission of IPv6 over IPv4 Domains Without Explicit Tunnels", Network Working Group, RFC 2529, Mar. 1999, pp. 1-10.
Eastlake D., "Domain Name System Security Extensions", Network Working Group, RFC 2535, Mar. 1999, pp. 1-44.
"BIG-IP® Global Traffic Manager™ and BIG-IP Link Controller™: Implementations," Manual 0304-00, Dec. 3, 2009, pp. 1-161, version 10.1, F5 Networks, Inc.
"BIG-IP® Systems: Getting Started Guide," Manual 0300-00, Feb. 4, 2010, pp. 1-102, version 10.1, F5 Networks, Inc.
"Detail Requirement Report: RQ-GTM-0000024," <http://fpweb/fptopic.asp?REQ:RQ-GTM-0000024>, F5 Networks, Inc., 1999, printed Mar. 31, 2010, 2 pages.
"DNS DDOS Protection Functional Spec," BigipDNSDDOSProtectionFS<TMO<TWiki, last accessed Mar. 31, 2010, 2 pages.
"DNS Security (DNSSEC) Solutions," <http://www.f5.com/solutions/security/dnssec>, F5 Networks, Inc., printed Aug. 23, 2010, pp. 1-4.
"F5 and Infoblox Provide Customers with Complete DNS Security Solution," <http://www.f5.com/news-press-events/press/2010/20100301.html>, Mar. 1, 2010, 2 pages, F5 Networks, Inc., Seattle and Santa Clara, California.
"PDR/CDR for RQ-GTM-0000028," BigipDNSDDOSProtectionPDR<TMOS<TWiki, last accessed on Mar. 31, 2010, pp. 1-14.
"Secure64 DNS Signer," <www.secure64.com>, 2 pages, Apr. 2010.
Silva, Peter, "DNSSEC: The Antidote to DNS Cache Poisoning and Other DNS Attacks,"F5 Technical Brief, 2009, pp. 1-10.
"Who is Xelerance," <http://www.xelerance.com>, slides 1-6, Jul. 2007.
Bagnulo, et al., "DNS extensions for Network Address translation from IPv6 Clients to IPv4 Servers", IETF Trust (Jul. 2010).

* cited by examiner

METHODS FOR DNSSEC PROXYING AND DEPLOYMENT AMELIORATION AND SYSTEMS THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application is a continuation of U.S. patent application Ser. No. 12/836,053, filed Jul. 14, 2010, which is hereby incorporated by reference in its entirety.

TECHNOLOGICAL FIELD

This technology generally relates to securing network applications, and more particularly, to systems and methods for Domain Name System Security Extensions (DNSSEC) proxying and deployment amelioration.

BACKGROUND

Global Internet Domain Name System, also referred to as the Domain Name System (DNS), defines a tree of names starting with root, ".", immediately below which are top level domain names such as ".com" and ".us". Below top level domain names there are normally additional levels of names. Domain Name System (DNS) was invented as a technology for enabling humans to identify computers, services, and resources connected to a network (e.g., Internet) by corresponding names rather than network addresses (e.g., Internet Protocol (IP) addresses) in a number format. DNS translates human readable names into unique binary information of network devices to enable users to find the devices they need. Unfortunately, conventional DNS is not secure and is highly prone to malicious interception. The insecure nature of DNS has been known to cause substantial loss of privacy, data, and identity theft, among many other problems. For example, one of the ways in which DNS can be exploited is called DNS cache poisoning. When a client device inputs a Uniform Resource Locator (URL) into a client browser, a DNS resolver checks the Internet for the proper name/number translation and location. Typically, DNS will accept the first response or answer obtained without question and direct the client device to the site referred to in the response. The server receiving the DNS response will also cache that information for a period of time until it expires, so upon the next request for that name/number, the site is immediately delivered to the requesting client device. Since users at client devices assume they are getting the correct information, when a malicious system responds to the DNS query first with modified, false information, security of the client device is breached. Not only does that single computer get sent to the wrong place, but if the malicious server is answering for a service provider, then thousands of users can get sent to a rogue system. This misdirection of a URL request can last for hours to days, depending on how long the server stores the information, and all the other DNS servers that propagate the information can also be affected. The imminent dangers posed by a rogue site include delivering malware, committing fraud, and stealing personal or sensitive information.

To overcome some of the drawbacks of conventional DNS systems, Domain Name System Security Extensions (DNSSEC) were introduced as an attempt to add security to DNS while maintaining the backward compatibility needed to scale with the Internet as a whole. DNSSEC adds a digital signature to ensure the authenticity of certain types of DNS transactions and, therefore, the integrity of the information. DNSSEC is a series of DNS protocol extensions, described in Request for Comments (RFCs) 4033, 4034, and 4035, hereby incorporated by reference in their entireties, that ensures the integrity of data returned by domain name lookups by incorporating a chain of trust into the DNS hierarchy. The chain is built using public key infrastructure (PKI), with each link in the chain consisting of a public/private key pair. Deploying DNSSEC involves signing zones with public/private key encryption and returning DNS responses with signatures. A client's trust in the signatures is based on the chain of trust established across administrative boundaries, from parent to child zone, using a Domain Name System Key (DNSKEY) and delegation signer (DS) resource records, which were not defined in DNS specifications. In DNSSEC, since an unbroken chain of trust is established from the root at the top through the top-level domain (TLD) and down to individual registrants, the client device's answer always receives an authenticated response. All zones are authenticated by "signing," in that a publisher of a zone signs that zone prior to publication, and the parent of that zone publishes the keys of that zone. With millions of zones, it is likely that the keys expire before the DNS records are updated. As a result, zone operators require techniques to automatically allocate keys to DNS records before these keys expire. Unfortunately, conventional systems are unable to handle management of keys for DNSSEC. Further, conventional DNS systems are unable to translate non-DNSSEC responses to DNSSEC responses.

Furthermore, conventional network systems are unable to handle DNSSEC signatures when zone names are dynamically updated. For example, consider a zone name that was previously signed statically. Subsequently, when the zone name is updated or changed, the DNSSEC signature for the earlier version of the zone is rendered invalid, and since the new zone is unsigned, there is no method for conventional systems to automatically enable DNSSEC for the dynamic update to the zone in real time.

In another related scenario, for global server load balancing (GSLB)-type DNS responses in which the Internet Protocol (IP) answer in a response to a request from a client device can change depending on the requesting client device, conventional systems are unable to provide DNSSEC for such dynamically changing domain names while at the same time performing global load balancing. Since GSLB can provide different answers to different clients for the same domain name, GSLB and DNSSEC are fundamentally at odds in the original design specifications. DNSSEC, as originally conceived, was focused solely on traditional static DNS and never considered the requirements of GSLB, or intelligent DNS. Unfortunately it is difficult for conventional systems to provide DNSSEC for dynamic DNS, and to provide DNSSEC for GSLB-type DNS responses in a load balancing scenario where there might be two different answers for the same request and the GSLB has to forward a signed response to the client device.

SUMMARY

One example of the technology is a method for providing authenticated domain name service. The method includes forwarding at a traffic management device a request for a domain name from a client device to one or more servers coupled to the traffic management device. The traffic management device receives a first response comprising at least a portion of the domain name from the one or more servers. The traffic management device attaches a first signature to the first response when the first response is determined by the traffic management device to be an unauthenticated response, and provides the first response with the first signature to the client device.

Another example includes a computer readable medium having stored thereon instructions for providing authenticated domain name service, which when executed by at least one processor, causes the processor to perform a number of steps. The steps include forwarding at a traffic management device a request for a domain name from a client device to one or more servers coupled to the traffic management device. The traffic management device receives a first response comprising at least a portion of the domain name from the one or more servers. The traffic management device attaches a first signature to the first response when the first response is determined by the traffic management device to be an unauthenticated response, and provides the first response with the first signature to the client device.

Another example is that of a traffic management device, which includes one or more processors executing one or more traffic management applications, a memory coupled to the one or more processors by a bus, a network interface controller coupled to the one or more processors and the memory and configured to receive data packets from a network that relate to the executing traffic management applications, and provide authenticated domain name service. In this example, at least one of the one or more processors is configured to execute programmed instructions stored in the memory and the network interface controller including logic capable of being further configured to implement forwarding at a traffic management device a request for a domain name from a client device to one or more servers coupled to the traffic management device. The traffic management device receives a first response comprising at least a portion of the domain name from the one or more servers. The traffic management device attaches a first signature to the first response when the first response is determined by the traffic management device to be an unauthenticated response, and provides the first response with the first signature to the client device.

The examples offer numerous advantages. By way of example only, technology disclosed enables signing DNS responses in real time and deploying DNSSEC quickly and easily in an existing network environment, thereby ensuring that answers to domain name requests received by the client devices when asking for name resolution come from a trusted name server, and not a hacker. The examples support Federal Information Processing Standard (FIPS) storage of the private keys, and are able to securely synchronize the keys between multiple FIPS devices. Additionally, examples of the disclosed technology use a cryptographic module or storage chip on a motherboard of a traffic management device to secure a unique hardware key as part of the multi-layer encryption process. When a response from a non-DNSSEC server is returned, the response is signed in real time to ensure continuous signing. The potential attacker cannot forge the signed response without the corresponding private key.

Further, the examples enable compliance with federal DNSSEC mandates and help protect valuable domain names and web properties from rogue servers sending invalid responses. Furthermore, the examples of the technology enable global server load balancing (GSLB)-type DNSSEC responses in which the IP answer can change depending on the requesting client by signing answers at the time the traffic management device (with load balancing functionality) decides what the answer to a request should be. These and other advantages, aspects, and features will become more apparent from the following detailed description when viewed in conjunction with the accompanying drawings. Non-limiting and non-exhaustive examples are described with reference to the following drawings. Accordingly, the drawings and descriptions below are to be regarded as illustrative in nature, and not as restrictive or limiting.

DETAILED DESCRIPTION

Various examples of the technology disclosed enable a traffic management device 110 to handle mismatches between non-DNSSEC and DNSSEC environments. For example, client devices operating in a DNSSEC environment need to communicate with servers operating in a non-DNSSEC environment. Traffic management device 110 provides secure conversion from one environment to another and prevents malicious "man-in-the-middle" attacks.

Figure 1:
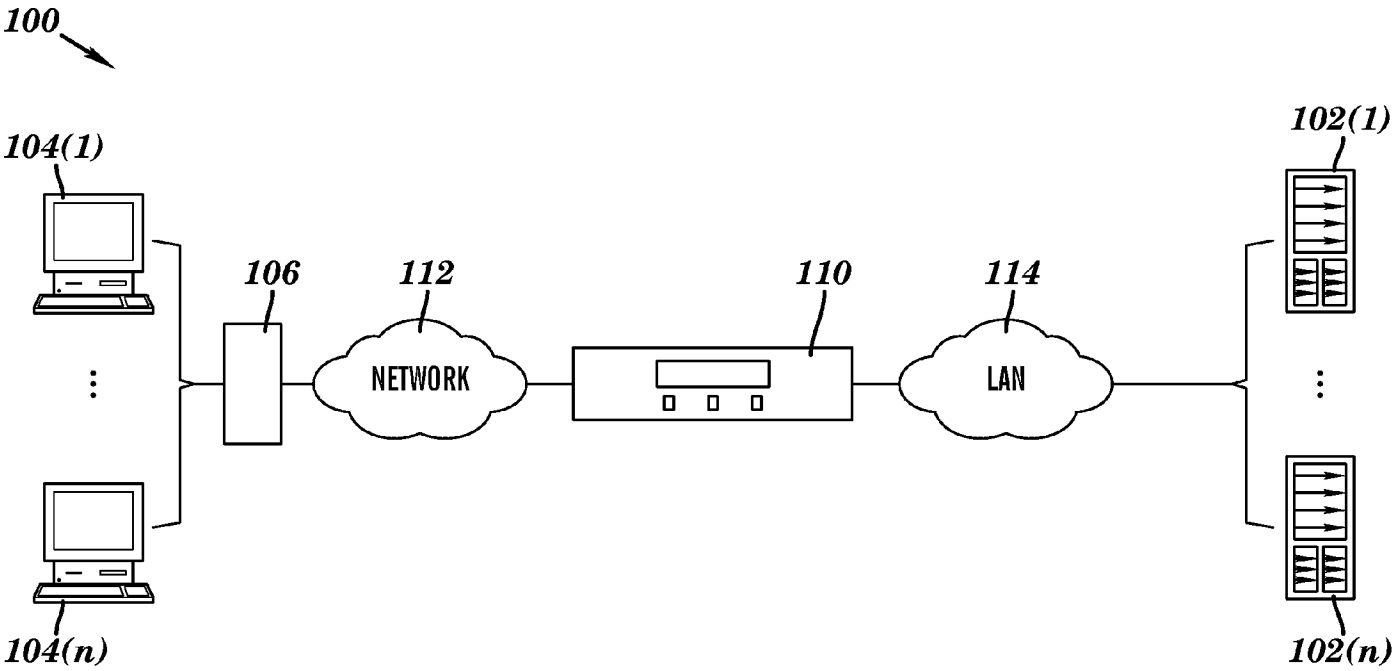
FIG. 1 illustrates an exemplary network system environment using traffic management device for DNSSEC proxying and deployment amelioration.

Referring to FIG. 1, an exemplary network system 100 including traffic management device 110 that is configured to provide authenticated domain name service, for example, to requesting client computers 104(1) to 104(n) is illustrated. By way of example only, a network 112 can provide responses and requests according to the Hyper-Text Transfer Protocol (HTTP) based application, request for comments (RFC) document guidelines or the Common Internet File System (CIFS) or network file system (NFS) protocol in this example, although the principles discussed herein are not limited to these examples and can include other application protocols and other types of requests (e.g., File Transfer Protocol (FTP) based requests). The exemplary network system 100 can include a series of one or more client devices such as client computers 104(1) to 104(n). Client computers 104(1)-104(n) are coupled to traffic management device 110 via a local domain name server (LDNS) 106. In some examples, LDNS 106 is optional and client computers 104(1)-104(n) are coupled to traffic management device 110 directly or via a network 112. Traffic management device 110 is interposed in between servers 102(1) to 102(n) and the client devices 104(1) to 104(n) for providing one or more communication channels through network 112 and a Local Area Network (LAN) 114, although other communication channels may be directly established between various devices in network system 100 without network 112 and/or LAN 114. For clarity and brevity, in FIG. 1 two server devices 102(1) and 102(n) are shown, but it should be understood that any number of server devices can use the exemplary network system 100. Likewise, two client devices 104(1)-104(n), one LDNS 106, and one traffic management device 110 are shown in FIG. 1, but any number of client devices, LDNSs, and traffic management devices can also use the exemplary network system 100 as well. Although network 112 and LAN 114 are shown, other numbers and types of networks could be used. The ellipses and the designation "n" denote an unlimited number of server devices and client devices, respectively.

Servers 102(1)-102(n) comprise one or more server computing machines or devices capable of operating one or more Web-based applications that may be accessed by network devices in the network 112, such as client computers 104(1)-104(n) (also referred to as client devices 104(1)-104(n)), via traffic management device 110, and may provide other data representing requested resources, such as domain name services and zones, particular Web page(s) corresponding to URL request(s), image(s) of physical objects, and any other objects, responsive to the requests, although the servers 102(1)-102(n) may perform other tasks and provide other types of resources. It should be noted that while only two servers 102(1) and 102(n) are shown in the network system 100 depicted in FIG. 1, other numbers and types of servers may be coupled to the traffic management device 110. It is also contemplated that one or more of the servers 102(1)-102(n) may be a cluster of servers managed by a network traffic management device such as traffic management device 110. In one example, servers 102(1)-102(n) are DNS servers in a DNS environment. In another example, servers 102(1)-102(n) are DNSSEC servers in a DNSSEC environment. In yet another example, servers 102(1)-102(n) are a mix of DNS and DNSSEC servers, as can be understood by those of ordinary skill in the art upon reading this disclosure. In some examples, servers 102(1)-102(n) are Berkeley Internet Name Domain (BIND) servers.

The client computers 104(1)-104(n) in this example (also interchangeably referred to as client devices 104(1)-104(n), client computing devices 104(1)-104(n), clients 104(1)-104(n), and client computing systems 104(1)-104(n)) can run interface applications such as Web browsers that can provide an interface to make requests for and send data, including DNS and DNSSEC requests, to different Web server-based applications via LDNS 106 connected to the network 112 and/or via traffic management device 110. A series of network applications can run on the servers 102(1)-102(n) that allow the transmission of data that is requested by the client computers 104(1)-104(n). Servers 102(1)-102(n) can provide data or receive data in response to requests directed toward the respective applications on the servers 102(1)-102(n) from the client computers 104(1)-104(n). For example, as per the Transmission Control Protocol (TCP), packets can be sent to the servers 102(1)-102(n) from the requesting client computers 104(1)-104(n) to send data, although other protocols (e.g., FTP) may be used. It is to be understood that the servers 102(1)-102(n) can be hardware or software executing on and supported by hardware, or can represent a system with multiple servers, which can include internal or external networks. Servers 102(1)-102(n) can be domain name servers with DNS capabilities hosting one or more website zones. Alternatively, servers 102(1)-102(n) can be DNSSEC servers in a DNSSEC environment hosting one or more website zones. For example, the servers 102(1)-102(n) can be any BIND version of Microsoft Domain Controllers provided by Microsoft Corporation of Redmond, Wash., although other types of servers can be used. Further, additional servers can be coupled to the network 112 and/or LAN 114 and many different types of applications can be available on servers coupled to the network 112 and/or LAN 114.

Generally, the client devices such as the client computers 104(1)-104(n) can include virtually any computing device capable of connecting to another computing device to send and receive information, including Web-based information. The set of such devices can include devices that typically connect using a wired (and/or wireless) communications medium, such as personal computers (e.g., desktops, laptops), mobile and/or smart phones and the like. In this example, the client devices can run browsers and other types of applications (e.g., web-based applications) that can provide an interface to make one or more requests to different server-based applications via network 112, although requests for other types of network applications and resources, for example URLs, may be made by client computers 104(1)-104(n). Client computers 104(1)-104(n) can be configured to make DNSSEC and non-DNSSEC requests to servers 102(1)-102(n), or other types of traffic management devices (e.g., routers, load balancers, application delivery controllers, and the like).

Client computers 104(1)-104(n) can submit requests to LDNS 106. LDNS 106 can respond to the requests when resources are locally stored on LDNS 106, for example, in a local cache memory. For example, a client computer may request for a URL www.example.com. If LDNS 106 has a valid copy of www.example.com, it can directly provide this URL to the requesting client computer. In other scenarios, LDNS 106 forwards the requests to traffic management device 110 via network 112. LDNS 106 can be configured to expedite requests for network resources (e.g., URLs) based upon a history of requests from one or more client computers 104(1)-104(n). In one example, LDNS 106 can provide an initial response to a requesting one of client computers 104(1)-104(n) while additional resources are being fetched from severs 102(1)-102(n) resulting in a faster initial response for a request from client computers 104(1)-104(n). By way of example only, LDNS 106 can be a proxy server, or a server similar to servers 102(1)-102(n) but located between client computers 104(1)-104(n) and traffic management device 110.

A series of Web-based and/or other types of protected and unprotected network applications can run on servers 102(1)-102(n) that allow the transmission of data that is requested by the client computers 104(1)-104(n). The client computers 104(1)-104(n) can be further configured to engage in a secure communication directly with the traffic management device 110 and/or the servers 102(1)-102(n), via LDNS 106, or otherwise, using mechanisms such as Secure Sockets Layer (SSL), Internet Protocol Security (IPSec), Transport Layer Security (TLS), and the like.

In this example, network 112 comprises a publicly accessible network, such as the Internet, which includes client computers 104(1)-104(n), although network 112 may comprise other types of private and public networks that include other devices. Communications, such as requests from client computers 104(1)-104(n) and responses from servers 102(1)-102(n), take place over network 112 according to standard network protocols, such as the HTTP and TCP/IP protocols in this example, but the principles discussed herein are not limited to this example and can include other protocols (e.g., FTP). Further, network 112 can include local area networks (LANs), wide area networks (WANs), direct connections, other types and numbers of network types, and any combination thereof. On an interconnected set of LANs or other networks, including those based on different architectures and protocols, routers, switches, hubs, gateways, bridges, crossbars, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links, optical fibers, and other communications links known to those of ordinary skill in the relevant arts. Generally, network 112 includes any communication medium and method by which data may travel between client devices 104(1)-104(n), servers 102(1)-102(n), and traffic management device 110, and these devices are provided by way of example only.

In this example, each of the servers 102(1)-102(n), traffic management device 110, LDNS 106, and client computers 104(1)-104(n) can include a central processing unit (CPU), controller or processor, a memory, and an interface system which are coupled together by a bus or other link, although other numbers and types of each of the components and other configurations and locations for the components can be used. Since these devices are well known to those of ordinary skill in the relevant art(s), they will not be described in further detail herein.

In addition, two or more computing systems or devices can be substituted for any one of the systems in the network system 100. Accordingly, principles and advantages of cloud computing and/or distributed processing, such as redundancy, replication, virtualization, and the like, can also be implemented, as appropriate, to increase the robustness and performance of the devices and systems of the network system 100. The network system 100 can also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, combination(s) thereof, and the like.

By way of example only and not by way of limitation, LAN 114 comprises a private local area network that includes the traffic management device 110 coupled to the one or more servers 102(1)-102(n), although the LAN 114 may comprise other types of private and public networks with other devices. Networks, including local area networks, besides being understood by those of ordinary skill in the relevant art(s), have already been described above in connection with network 112, and thus will not be described further here.

As shown in the example environment of network system 100 depicted in FIG. 1, the traffic management device 110 can be interposed between the network 112 and the servers 102(1)-102(n) coupled via LAN 114 as shown in FIG. 1. Again, the network system 100 could be arranged in other manners with other numbers and types of devices. Also, the traffic management device 110 is coupled to network 112 by one or more network communication links, and intermediate network devices, such as routers, switches, gateways, hubs, crossbars, and other devices. It should be understood that the devices and the particular configuration shown in FIG. 1 are provided for exemplary purposes only and thus are not limiting. Although a single traffic management device 110, additional traffic management devices may be coupled in series and/or parallel to the traffic management device 110, thereby forming a cluster, depending upon specific applications, and the single traffic management device 110 shown in FIG. 1 is by way of example only, and not by way of limitation.

Generally, the traffic management device 110 manages network communications, which may include one or more client requests and server responses, to/from the network 112 between the client computers 104(1)-104(n) and one or more of the servers 102(1)-102(n) in LAN 114 in these examples. These requests may be destined for one or more servers 102(1)-102(n), and, as alluded to earlier, may take the form of one or more TCP/IP data packets originating from the network 112, passing through one or more intermediate network devices and/or intermediate networks, until ultimately reaching the traffic management device 110, for example.

In one example, traffic management device 110 is configured as a global server load balancing device that distributes end-user application requests based on business policies, data center conditions, network conditions, user location, and application performance, such that each request from client computers 104(1)-104(n) is automatically directed to the closest or best-performing data center hosting one or more servers 102(1)-102(n). In this example, traffic management device 110 provides DNSSEC signed responses even when zone names have been dynamically updated. Although in this example, traffic management device 110 has global server load balancing capabilities, in alternative examples traffic management device 110 may receive responses from a global server load balancing (GSLB) device coupled to LAN 114. By way of example only, such a global load balancing device can be a BIG-IP® Global Traffic Manager™ provided by F5 Networks, Inc., of Seattle, Wash.

In addition, as discussed in more detail with reference to FIGS. 2-3, traffic management device 110 is configured to provide authenticated domain name service. In any case, the traffic management device 110 may manage the network communications by performing several network traffic management related functions involving network communications, secured or unsecured, such as load balancing, access control, VPN hosting, network traffic acceleration, encryption, decryption, cookie, and key management and providing authenticated domain name service in accordance with the systems and processes described further below in connection with FIGS. 2-3, for example.

Figure 2:
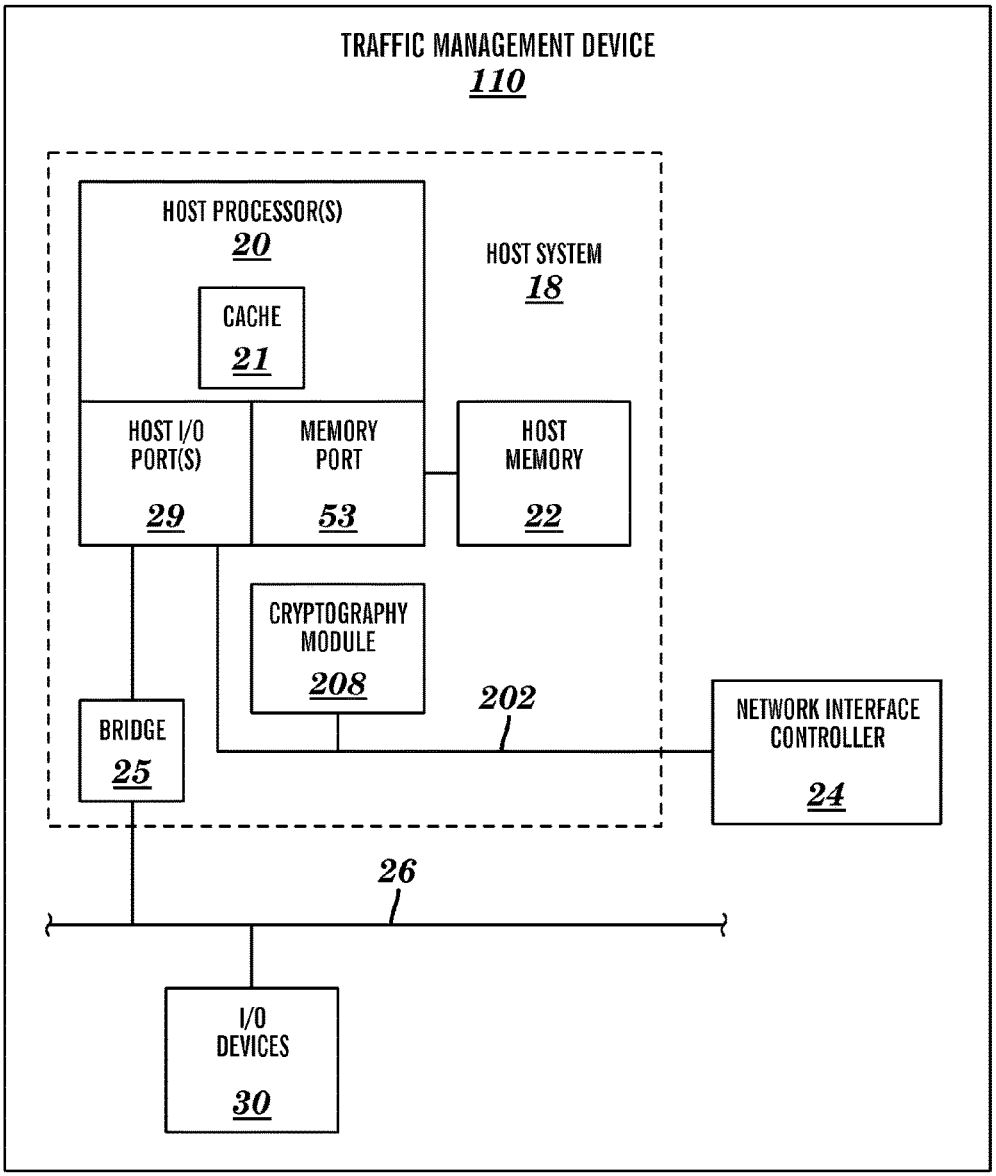
FIG. 2 is a partly schematic and partly functional block diagram of traffic management device in the exemplary network environment of FIG. 1.

Referring to FIG. 2, an exemplary traffic management device 110 is illustrated. Included within the traffic management device 110 is a system bus 26 (also referred to as bus 26) that communicates with a host system 18 via a bridge 25 and with an input-output (I/O) device 30. In this example, a single I/O device 30 is shown to represent any number of I/O devices connected to bus 26. In one example, bridge 25 is in further communication with a host processor 20 via host input output (I/O) ports 29. Host processor 20 can further communicate with a network interface controller 24 via a CPU bus 202, a host memory 22 (via a memory port 53), and a cache memory 21. As outlined above, included within the host processor 20 are host I/O ports 29, memory port 53, and a main processor (not shown separately). In this example, host system 18 includes a cryptography module 208.

In one example, traffic management device 110 can include the host processor 20 characterized by anyone of the following component configurations: computer readable medium and logic circuits that respond to and process instructions fetched from the host memory 22; a microprocessor unit, such as: those manufactured by Intel Corporation of Santa Clara, Calif.; those manufactured by Motorola Corporation of Schaumburg, Ill.; those manufactured by Transmeta Corporation of Santa Clara, Calif.; the RS/6000 processor such as those manufactured by International Business Machines of Armonk, N.Y.; a processor such as those manufactured by Advanced Micro Devices of Sunnyvale, Calif.; or any other combination of logic circuits capable of executing the systems and methods described herein. Still other examples of the host processor 20 can include any combination of the following: a microprocessor, a microcontroller, a central processing unit with a single processing core, a central processing unit with two processing cores, or a central processing unit with more than one processing core.

Examples of the traffic management device 110 include one or more application delivery controller devices of the BIG-IP® product family provided by F5 Networks, Inc. of Seattle, Wash., although other types of traffic management devices may be used. In an exemplary structure and/or arrangement, traffic management device 110 can include the host processor 20 that communicates with cache memory 21 via a secondary bus also known as a backside bus, while another example of the traffic management device 110 includes the host processor 20 that communicates with cache memory 21 via the system bus 26. The local system bus 26 can, in some examples, also be used by the host processor 20 to communicate with more than one type of I/O devices 30. In some examples, the local system bus 26 can be anyone of the following types of buses: a VESA VL bus; an ISA bus; an EISA bus; a Micro Channel Architecture (MCA) bus; a PCI bus; a PCI-X bus; a PCI-Express bus; or a NuBus. Other example configurations of the traffic management device 110 include I/O device 30 that is a video display (not shown separately) that communicates with the host processor 20 via an Advanced Graphics Port (AGP). Still other versions of the traffic management device 110 include host processor 20 connected to I/O device 30 via any one or more of the following connections: HyperTransport, Rapid I/O, or InfiniBand. Further examples of the traffic management device 110 include a communication connection where the host processor 20 communicates with one I/O device 30 using a local interconnect bus and with a second I/O device (not shown separately) using a direct connection. As described above, included within some examples of the traffic management device 110 is each of host memory 22 and cache memory 21. The cache memory 21, will, in some examples, be any one of the following types of memory: SRAM; BSRAM; or EDRAM. Other examples include cache memory 21 and host memory 22 that can be anyone of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein.

The host memory 22 and/or the cache memory 21 can, in some examples, include one or more memory devices capable of storing data and allowing any storage location to be directly accessed by the host processor 20. Such storage of data can be in a local database internal to traffic management device 110, or external to traffic management device 110 coupled via one or more input output ports of network interface controller 24. Further examples of traffic management device 110 include a host processor 20 that can access the host memory 22 via one of either: system bus 26; memory port 53; or any other connection, bus or port that allows the host processor 20 to access host memory 22.

One example of the traffic management device 110 provides support for anyone of the following installation devices: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable compact disk (CD) for GNU/Linux distribution such as KNOPPIX®, a hard-drive or any other device suitable for installing applications or software. Applications can, in some examples, include a client agent, or any portion of a client agent. The traffic management device 110 may further include a storage device (not shown separately) that can be either one or more hard disk drives, or one or more redundant arrays of independent disks; where the storage device is configured to store an operating system, software, programs applications, or at least a portion of the client agent. A further example of the traffic management device 110 includes an installation device that is used as the storage device.

Furthermore, the traffic management device 110 can include network interface controller 24 to communicate, via an input-output port inside network interface controller 24, with a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, optical connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the traffic management device 110 includes network interface controller 24 configured to communicate with additional computing devices via any type and/or form of gateway or tunneling protocol such as Secure Socket Layer (SSL) or Transport Layer Security (TLS), or the Citrix Gateway Protocol manufactured by Citrix Systems, Inc. of Fort Lauderdale, Fla. Versions of the network interface controller 24 can comprise anyone of: a built-in network adapter; a network interface card; a PCMCIA network card; a card bus network adapter; a wireless network adapter; a USB network adapter; a modem; or any other device suitable for interfacing the traffic management device 110 to a network capable of communicating and performing the methods and systems described herein.

In various examples, the traffic management device 110 can include any one of the following I/O devices 30: a keyboard; a pointing device; a mouse; a gesture based remote control device; a biometric device; an audio device; track pads; an optical pen; trackballs; microphones; drawing tablets; video displays; speakers; inkjet printers; laser printers; and dye sublimation printers; or any other input/output device able to perform the methods and systems described herein. Host I/O ports 29 may in some examples connect to multiple I/O devices 30 to control the one or more I/O devices 30. Some examples of the I/O devices 30 may be configured to provide storage or an installation medium, while others may provide a universal serial bus (USB) interface for receiving USB storage devices such as the USB Flash Drive line of devices manufactured by Twintech Industry, Inc. Still other examples of an I/O device 30 may be bridge 25 between the system bus 26 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

According to some examples, traffic management device 110 includes cryptography module 208 integrated as part of host system 18 for carrying out various exemplary functions of storing private and public keys. Alternatively, cryptography module 208 may be a part of an autonomous application security manager module integrated with or communicating independently with the traffic management device 110. An exemplary application security manager is the BIG-IP® Application Security Manager™ provided by F5 Networks, Inc. of Seattle, Wash. In one example, cryptography module 208 includes a crypto-storage chip on the motherboard to secure one or more unique hardware keys as part of the multi-layer encryption process employed by traffic management device 110 to secure keys.

Accordingly, components of traffic management device 110 include one or more processors (e.g., host processor 20) executing one or more traffic management applications, memory (e.g., cache memory 21, and/or host memory 22) coupled to the one or more processors by a bus, network interface controller 24 coupled to the one or more processors and the host memory 22 and configured to receive data packets from a network that relate to the executing traffic management applications, and provide authenticated domain name service. In this example, at least one of the one or more processors is configured to execute programmed instructions stored in the memory (e.g., cache memory 21, and/or host memory 22) and the network interface controller 24 including logic capable of being further configured to implement forwarding at traffic management device 110 a request for a domain name from a client device (e.g., one or more of client computers 104(1)-104(n)) to one or more servers (e.g., servers 102(1)-102(n)) coupled to traffic management device 110. The traffic management device 110 receives a first response comprising at least a portion of the domain name from the one or more servers 102(1)-102(n). The traffic management device 110 attaches a first signature to the first response when the first response is determined by the traffic management device 110 to be an unauthenticated response, and provides the first response with the first signature to the client device (e.g., one or more of client computers 104(1)-104(n)).

The operation of example processes for providing authenticated domain name service using traffic management device 110 shown in FIGS. 1-2, will now be described with reference back to FIGS. 1-2 in conjunction with flow diagram or flowchart 300 shown in FIG. 3, respectively. The flowchart 300 is representative of example machine readable instructions for implementing in dynamic real-time authenticated domain name service, for example, at the traffic management device 110. In this example, the machine readable instructions comprise an algorithm for execution by: (a) a processor (e.g., host processor 20), (b) a controller, and/or (c) one or more other suitable processing device(s) within host system 18, for example. The algorithm may be implemented in software stored on tangible computer readable media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or implemented in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, or the like). For example, at least some of the components of the traffic management device 110 could be implemented by software, hardware, and/or firmware. Also, some or all of the machine readable instructions represented by the process of flowchart 300 of FIG. 3 may be implemented manually at the traffic management device 110, for example, using a command line interface (CLI) prompt window operated by a system administrator. Further, although the example algorithm is described with reference to flowchart 300, persons of ordinary skill in the art will readily appreciate that many other methods of implementing the example machine readable instructions may alternatively be used. For example, the order of execution of the blocks in flowchart 300 may be changed, and/or some of the blocks described may be changed, eliminated, or combined.

Figure 3:
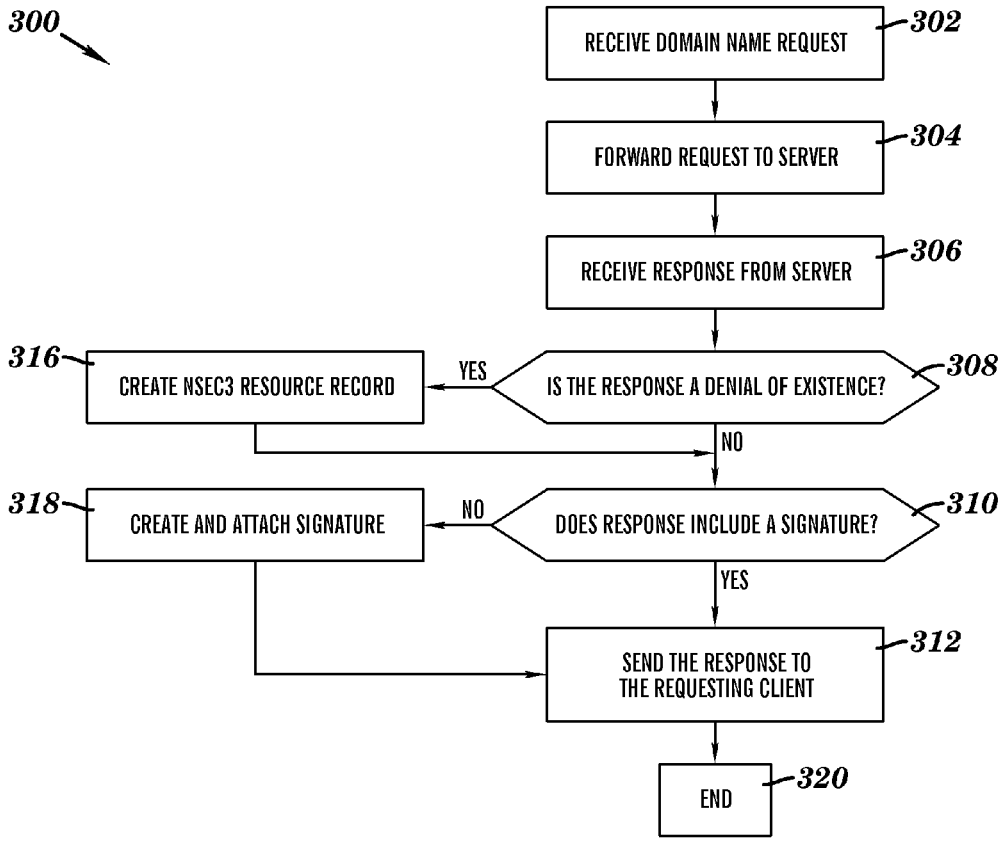
FIG. 3 is a flow chart of an exemplary process and method for DNSSEC proxying and deployment amelioration when a DNSSEC request is to be serviced using non-DNSSEC server devices.

Referring now to FIG. 3, flowchart 300 discusses a scenario where responses received from servers 102(1)-102(n) are not signed. It is to be noted servers 102(1)-102(n) may be able to sign some responses but are unable to sign some other responses, depending upon the request from client computers 104(1)-104(n).

In step 302 of the flowchart 300, traffic management device 110 receives a request from one of client computers 104(1)-104(n). In this example, the request from the client computers 104(1)-104(n) can be a DNSSEC request for an address record (also referred to as an 'A' record) that requires a signed response, or an authenticated response from one or more servers 102(1)-102(n). In this example, servers 102(1)-102(n) may not be able to provide an authenticated response to the request since the servers 102(1)-102(n) are in a conventional DNS only environment. By way of example only, the request can include a URL for a website www.example.com, where "." is the root, ".com" is a top-level domain, and ".example" is a second level domain, and so on, as can be understood by those of ordinary skill in the art. Further by way of example only and not by way of limitation, other types of top-level domains such as ".gov," ".org," ".net," and/or country specific domains (e.g., ".us") may be a part of the request from client computers 104(1)-104(n). The request from one of the client computers 104(1)-104(n) can come via LDNS 106, which may or may not have a cached copy of the requested resource for providing an initial response to the request. It is to be noted that the requests can be originating from anywhere around the earth, and are not geographically or otherwise restricted in their origin.

In step 304, traffic management device 110 forwards the received request to one of the servers 102(1)-102(n) after removing bits and/or headers to convert the request into a regular DNS request that can be understood by servers 102(1)-102(n). Although in this example servers 102(1)-102(n) are not DNSSEC enabled, they are still on a trusted network (e.g., on LAN 114).

In step 306, traffic management device 110 receives a response from one of servers 102(1)-102(n). In one example, the response includes a resource record set (RRSET) including one or more address records. The RRSET includes all the records of a given type for a given domain included in the original request, as known to those of ordinary skill in the art. In this example, the response can be for the root ".". Alternatively, the response can be for the top level domain ".com" and/or second level domain ".example". The response can include a plurality of responses in succession starting from the root, which is the highest level, to the lowest level domain, and can therefore comprise building a chain of trust for signing response received from servers 102(1)-102(n). For example, each of the responses from servers 102(1)-102(n) for root, top level, and second level domains, can be respectively analyzed for a signature, determined by the traffic management device 110 (e.g., in step 310 below). In the example of FIG. 3, since servers 102(1)-102(n) are regular DNS servers that are authoritative for the requested zone but do not have the capability to sign, the responses for root, top level, and second level domains will not be signed responses. As a result, the response received from servers 102(1)-102(n) in this example will not be DNSSEC compliant. For example, in one scenario a requested domain name, e.g., www.example.com, will not have a signature attached to it when received by the traffic management device 110. In another scenario, there will be dynamic updates to www.example.com records. In this scenario, a previously authenticated response forwarded by the traffic management device 110 to the requesting one of client computers 104(1)-104(n) will no more have a valid signature, and will need to be signed again at the traffic management device 110, as discussed below for step 318.

In step 308, traffic management device 110 determines whether the received response from one of the servers 102(1)-102(n) is a denial of existence response for the requested resource. Denial of existence can occur, for example, when the original request from the client computers 104(1)-104(n) is for a non-existent domain name. Alternatively, a denial of existence response may be received when one or more data records within a zone does not exist. For example, the name www.example.com may exist but an address record (or, 'A' record) at www.example.com may not exist and result in a denial of existence response from servers 102(1)-102(n). Since A records are well known to those of ordinary skill in the art, they will not be described in detail here. If the received response from one of the servers 102(1)-102(n) is a denial of existence, the flow proceeds to step 316, and if not, the flow proceeds to step 310.

In step 316, when the traffic management device 110 determines the received response from one of the servers 102(1)-102(n) is a denial of existence response, traffic management device 110 creates one or more next secure (NSEC3) resource records belonging to a cryptographically hashed domain name. Since NSEC3 resource records are known to those of ordinary skill in the art, they will not be described in detail here. In one example, traffic management device 110 dynamically manufactures the NSEC3 resource record based upon the request from the client, with no knowledge of the actual content of the relevant zone on domain name servers 102(1)-102(n), such that the manufactured NSEC3 resource record can be used by the client to prove non-existence of the requested name. In another example, traffic management device 110 may dynamically manufacture the NSEC3 resource record based upon the request from the client with some knowledge of the actual content of the relevant zone on domain name servers 102(1)-102(n). In yet another example, traffic management device 110 may dynamically manufacture the NSEC3 resource record based upon the request from the client with complete knowledge of the actual content of the relevant zone on domain name servers 102(1)-102(n). By way of example only, creating the NSEC3 resource record includes utilizing one of Secure Hash Algorithms (SHAs), although other types of hashing algorithms may be used. In this example, resource records created by traffic management device 110 as a response to a denial of existence of original resource from servers 102(1)-102(n) are trusted by client computers 104(1)-104(n), since traffic management device 110 itself is a trusted device for client computers 104(1)-104(n). Signatures to the created zone are then attached by traffic management device 110 as described in step 318 below.

One example of how the NSEC3 resource record is created by traffic management device 110 is by taking the requested non-existent name, say www.example.com and performing hashing using one of the DNSSEC specified secure hashing algorithms (e.g., SHA1) prior to sending the response to the requesting one of the client computers 104(1)-104(n). Assuming, by way of example only and not by way of limitation, the resulting hash is equal to "12345". The requesting one of client computers 104(1)-104(n) may need a "spanning" NSEC3 record for its proof of non-existence (i.e., the closest enclose proof as disclosed in RFC 5155), or it may need a "matching" NSEC3 record (i.e., the exact enclose proof as also disclosed in RFC 5155). For a spanning record, this example would take the hashed name "12345" and perform, for example, a "+1" or "−1" on the number the hash represents. Accordingly, in this case two numbers "12344" and "12346" are generated. These new hash values would span the original hashed non-existent name and would be used to create a spanning NSEC3 record at traffic management device 110. Similarly, for a matching record, two hash values are required, however, only the "+1" is created and paired with the original name by traffic management device 110, resulting in an NSEC3 record containing "12345" and "12346". It is to be noted that although in the examples above "+/−1" values were used, any increment method, for example "+/−N" where N is an integer, may be used and the "+/−1" is only an illustrative example and is not limiting. Additionally, this example represents a method to manufacture an NSEC3 resource record at traffic management device 110 in substantially real-time upon receipt of the response in step 306 with no knowledge of the actual set of names in the zone. As discussed above, additional scenarios where traffic management device 110 may have some or complete knowledge of contents of the zone may use this example for generating NSEC3 records. Since spanning and matching records are known to those of ordinary skill in the art, and are disclosed in RFC 5155 hereby incorporated by reference in its entirety, the will not be described in detail herein.

In step 310, traffic management device 110 determines if the response received from one of the servers 102(1)-102(n) was a DNSSEC response that included signatures for a top level domain, a second level domain, a sub-level domain, and/or all levels of the domain name. This determination can be made by the traffic management device 110 by checking whether or not the received response from servers 102(1)-102(n) includes a resource record signature (RRSIG), although other methods of determining may be used. Since RRSIG records that were introduced as a part of DNSSEC are known to those of ordinary skill in the art, they will not be described in detail here. If the received response includes an RRSIG, the flow proceeds to step 314. If not, the traffic management device 110 determines the response is unauthenticated, and the flow proceeds to step 318.

In step 318, traffic management device 110 dynamically in real-time generates one or more cryptographic signatures (e.g., RRSIG records) and attaches the signatures to the response received from one or more servers 102(1)-102(n). Attaching the signature can be performed in one or more of the following exemplary ways, although other ways of attaching signatures "on the fly" may be contemplated by those of ordinary skill in the art after reading this disclosure. For attaching a signature, traffic management device 110 is configured to allocate zone signing keys (ZSKs) and Key Signing Keys (KSKs) for the received response from servers 102(1)-102(n). In this example, KSKs are used to sign other DNSKEY records, while ZSKs are used to sign all resource record sets (RRSETs). By way of example only, both KSKs and ZSKs can be made stronger by using more bits in the key material, and for security reasons, can be rotated at different time intervals (e.g., KSK every 12 months and the ZSK every one to two months). The public key infrastructure enables client computers 104(1)-104(n) to validate the integrity of the response received from non-DNSSEC servers 102(1)-102(n) signed with the private key. Since the private key of the public/private key pair could be used to impersonate a valid signer, those keys are kept secure, by way of example only, by storing them as hardware keys in cryptography module 208. By way of example only, cryptography module 208 supports FIPS storage of the private keys. Additionally, traffic management device 110 is configured to securely synchronize the keys between multiple FIPS devices, e.g., multiple traffic management devices. In one example, cryptography module 208 includes a crypto-storage chip on the motherboard to secure a unique hardware key as part of the multi-layer encryption process employed by traffic management device 110 to secure KSKs and ZSKs. Alternatively, KSKs and ZSKs may be secured, by way of example only and not by way of limitation, using secure SSL-encrypted storage systems. Accordingly, traffic management device 110 encrypts the response using the one or more keys, as discussed above.

In step 312, traffic management device 110 forwards the response with the signature, along with a public key to the requesting one of the client computers 104(1)-104(n). Since traffic management device 110 signs the response from servers 102(1)-102(n) and client computers 104(1)-104(n) trust the traffic management device 110, client computers 104(1)-104(n) can use the DNSKEY to validate the RRSET using RRSIG included in the forwarded response from traffic management device 110. The flow ends in step 320.

Example Use Case

In one exemplary global server load balancing (GSLB)-type scenario, traffic management device 110 configured as a load balancing device can provide responses that can change depending on the requesting client out of client computers 104(1)-104(n). Alternatively, traffic management device 110 may receive responses routed from a global load balancer connected to LAN 114. For example, for a request www.example.com, traffic management device 110 may receive two different responses—one from a server 102(1) and another from a server 102(2). Out of the two responses, it is possible that the response from server 102(1) may be the only one that is signed and the response from server 102(2) may not be signed. However, the response from server 102(2) might be the most current updated response with updated resource records. In such a scenario, traffic management device 110 will sign the response from server 102(2) according to the steps of flowchart 300, and forward the signed response to the client computers 104(1)-104(n), instead of sending the older signed response from server 102(1)-102(n).

Servers 102(1)-102(n) have DNS entries that are statically signed. Each time a DNS entry is updated, signatures associated with the DNS entries become outdated and those DNS entries have to be signed again either manually or offline. A change to a DNS entry means a change to an IP address that the DNS entry is translated into. Therefore, for updates to DNS entries, traffic management device 110 signs or authenticates the new responses including updated IP addresses, and performs load balancing based on the new signed IP addresses, while discarding the outdated or older IP addresses (and hence, older DNS entries).

The examples of the technology described herein provide numerous advantages. For example, when client computers 104(1)-104(n) are in a DNSSEC environment requiring authenticated responses, examples disclosed herein enable such client computers 104(1)-104(n) to communicate with non-DNSSEC servers 102(1)-102(n) on a real time basis without any upgrades to software on client computers 104 (1)-104(n). Such dynamic "on-the-fly" authentication performed by traffic management device 110 when servers 102(1)-102(n) are unable to sign the responses, ensure that the client computers 104(1)-104(n) receive valid resource records that are from a trusted source, and not from a rogue server or site. The technology described also enables administrators of large non-DNSSEC DNS deployments to quickly become DNSSEC compliant by interposing traffic management device 110 according to the examples disclosed in such legacy deployments resulting in an easy and fast DNSSEC compliance solution.

Having thus described the basic concepts, it will be rather apparent to those skilled in the art that the foregoing detailed disclosure is intended to be presented by way of example only and is not limiting. Various alterations, improvements, and modifications will occur and are intended to those skilled in the art, though not expressly stated herein. The order that the measures and processes for providing secure application delivery are implemented can also be altered. Furthermore, multiple networks in addition to network 112 and LAN 114 could be associated with traffic management device 110 from/to which network packets can be received/transmitted, respectively. These alterations, improvements, and modifications are intended to be suggested by this disclosure, and are within the spirit and scope of the examples. Additionally, the recited order of processing elements or sequences, or the use of numbers, letters, or other designations therefore, is not intended to limit the claimed processes and methods to any order except as can be specified in the claims.

What is claimed is:

1. A method for providing authenticated domain name service comprising:

forwarding at a traffic management device a domain name system security extension (DNSSEC) type request for a domain name received from a client device to one or more domain name system (DNS) servers;

receiving at the traffic management device a response for at least a portion of the domain name from the one or more servers, wherein the one or more servers are not domain name system security extension (DNSSEC) compliant;

creating at the traffic management device a resource record when the response is determined to be a denial of existence response for the requested domain name;

generating at the traffic management device a signature and signing the response or the resource record using the signature; and sending at the traffic management device the signed resource record or response to the client device in response to the request.

2. The method as set forth in claim 1, wherein the one or more servers are authoritative for a zone associated with the at least a portion of the domain name.

3. The method as set forth in claim 1, wherein the signing further comprises encrypting the response or the resource record using a stored private key, the method further comprising performing at the traffic management device a hash of the encrypted response or resource record prior to the sending.

4. The method as set forth in claim 1, wherein the at least a portion of the domain name comprises a top-level domain name that is known to be authenticated.

5. The method as set forth in claim 1, wherein at least one of the first or second server is authoritative for a zone associated with the at least a portion of the domain name.

6. A non-transitory computer readable medium having stored thereon instructions for providing authenticated domain name service comprising machine executable code which when executed by at least one processor, causes the processor to perform steps comprising:

forwarding a domain name system security extension (DNSSEC) type request for a domain name received from a client device to one or more domain name system (DNS) servers;

receiving a response for at least a portion of the domain name from the one or more servers, wherein the one or more servers are not domain name system security extension (DNSSEC) compliant;

creating a resource record when the response is determined to be a denial of existence response for the requested domain name;

generating a signature and signing the response or the resource record using the signature; and sending the signed resource record or response to the client device in response to the request.

7. The medium as set forth in claim 6, wherein the one or more servers are authoritative for a zone associated with the at least a portion of the domain name.

8. The medium as set forth in claim 6, wherein the signing further comprises encrypting the response or the resource record using a stored private key, the medium further having stored thereon instructions comprising machine executable code which when executed by the at least one processor causes the processor to perform steps further comprising performing a hash of the encrypted response or resource record prior to the sending.

9. The medium as set forth in claim 6, wherein the at least a portion of the domain name comprises a top-level domain name that is known to be authenticated.

10. A traffic management device comprising:

at least one processor; and a memory coupled to the at least one processor which is configured to be capable of executing programmed instructions stored in the memory to perform steps comprising:

forwarding a domain name system security extension (DNSSEC) type request for a domain name received from a client device to one or more domain name system (DNS) servers;

receiving a response for at least a portion of the domain name from the one or more servers, wherein the one or more servers are not domain name system security extension (DNSSEC) compliant;

creating a resource record when the response is determined to be a denial of existence response for the requested domain name;

generating a signature and signing the response or the resource record using the signature; and sending the signed resource record or response to the client device in response to the request.

11. The device as set forth in claim 10, wherein the one or more servers are authoritative for a zone associated with the at least a portion of the domain name.

12. The device as set forth in claim 10, wherein the signing further comprises encrypting the response or the resource record using a stored private key, the at least one processor further configured to be capable of executing programmed instructions stored in the memory to perform steps further comprising performing a hash of the encrypted first response or resource record prior to the sending.

13. The device as set forth in claim 10, wherein the at least a portion of the domain name comprises a top-level domain name that is known to be authenticated.

14. A method for providing authenticated domain name service comprising:

forwarding at a traffic management device a domain name system security extension (DNSSEC) type request for a domain name received from a client device to a global server load balancer coupled to at least first domain name system (DNS) server that is not DNSSEC compliant and a second DNS server that is DNSSEC compliant;

receiving at the traffic management device first and second responses for at least a portion of the domain name from the global server load balancer, wherein the first response is from the first server and the second response is from the second server;

generating at the traffic management device a signature and signing the first response using the signature when the first response is determined to be more current than the second response; and sending at the traffic management device the signed first response to the client device in response to the request.

15. The method as set forth in claim 1, wherein the first and second responses are denial of existence responses and the method further comprises:

creating at the traffic management device a resource record;

generating at the traffic management device a signature and signing the first or second response or the resource record using the signature; and sending at the traffic management device the signed resource record or first or second response to the client device in response to the request.

16. The method as set forth in claim 15, wherein the signing further comprises encrypting the first or second response or the resource record using a stored private key, the method further comprising performing at the traffic management device a hash of the encrypted first or second response or resource record prior to the sending.

17. A non-transitory computer readable medium having stored thereon instructions for providing authenticated domain name service comprising machine executable code which when executed by at least one processor, causes the processor to perform steps comprising:

forwarding a domain name system security extension (DNSSEC) type request for a domain name received from a client device to a global server load balancer coupled to at least first domain name system (DNS) server that is not DNSSEC compliant and a second DNS server that is DNSSEC compliant;

receiving first and second responses for at least a portion of the domain name from the global server load balancer, wherein the first response is from the first server and the second response is from the second server;

generating a signature and signing the first response using the signature when the first response is determined to be more current than the second response; and sending the signed first response to the client device in response to the request.

18. The medium as set forth in claim 17, wherein the first and second responses are denial of existence responses and the medium further has stored thereon instructions comprising machine executable code which when executed by the at least one processor causes the processor to perform steps further comprising:

creating at the traffic management device a resource record;

generating at the traffic management device a signature and signing the first or second response or the resource record using the signature; and sending at the traffic management device the signed resource record or first or second response to the client device in response to the request.

19. The medium as set forth in claim 18, wherein the signing further comprises encrypting the first or second response or the resource record using a stored private key, the medium further having stored thereon instructions comprising machine executable code which when executed by the at least one processor causes the processor to perform steps further comprising performing a hash of the encrypted first or second response or resource record prior to the sending.

20. The medium as set forth in claim 17, wherein at least one of the first or second server is authoritative for a zone associated with the at least a portion of the domain name.

21. A traffic management device comprising:

at least one processor; and a memory coupled to the at least one processor which is configured to be capable of executing programmed instructions stored in the memory to perform steps comprising:

forwarding a domain name system security extension (DNSSEC) type request for a domain name received from a client device to a global server load balancer coupled to at least first domain name system (DNS) server that is not DNSSEC compliant and a second DNS server that is DNSSEC compliant;

receiving first and second responses for at least a portion of the domain name from the global server load balancer, wherein the first response is from the first server and the second response is from the second server;

generating a signature and signing the first response using the signature when the first response is determined to be more current than the second response; and sending the signed first response to the client device in response to the request.

22. The device as set forth in claim 21, wherein the first and second responses are denial of existence responses and the at least one processor is further configured to be capable of executing programmed instructions stored in the memory to perform steps further comprising:

creating at the traffic management device a resource record;

generating at the traffic management device a signature and signing the first or second response or the resource record using the signature; and sending at the traffic management device the signed resource record or first or second response to the client device in response to the request.

23. The device as set forth in claim 22, wherein the signing further comprises encrypting the first or second response or the resource record using a stored private key, the at least one processor further configured to be capable of executing programmed instructions stored in the memory to perform steps further comprising performing a hash of the encrypted first or second response or resource record prior to the sending.

24. The device as set forth in claim 21, wherein at least one of the first or second server is authoritative for a zone associated with the at least a portion of the domain name.

*25. A non-transitory computer readable medium having stored thereon instructions for providing authenticated domain name service comprising machine executable code which when executed by at least one processor, causes the processor to:*

*receive a domain name system security extension (DNSSEC) request for a domain name from a DNSSEC compliant computing device;*

*generate a domain name system (DNS) request corresponding to the DNSSEC request for the domain name;*

*send the DNS request for the domain name to one or more DNS servers that are not DNSSEC compliant;*

*receive a DNS compliant response for at least a portion of the domain name from the one or more DNS servers;*

*create a signed resource record that is DNSSEC compliant when the DNS compliant response from the one or more DNS servers is a denial of existence response for the requested domain name; and*

*send the signed resource record to the requesting DNSSEC compliant computing device.*

*26. The medium as set forth in claim 25, wherein the DNS servers are authoritative for a zone associated with the at least a portion of the domain name.*

*27. The medium as set forth in claim 25, wherein the executable code, when executed by the processor, further causes the processor to:*

*encrypt the signed resource record using a stored private key; and*

*perform a hash of the encrypted signed resource record prior to sending the signed resource record to the requesting DNSSEC compliant computing device.*

*28. The medium as set forth in claim 25, wherein the at least a portion of the domain name comprises a top-level domain name that is known to be authenticated.*

*29. A method for providing authenticated domain name service implemented by a system comprising one or more network traffic management devices, one or more servers, or one or more clients, the method comprising:*

*receiving a domain name system security extension (DNSSEC) request for a domain name from a DNSSEC compliant computing device;*

*generating a domain name system (DNS) request corresponding to the DNSSEC request for the domain name;*

*sending the DNS request for the domain name to one or more DNS servers that are not DNSSEC compliant;*

*receiving a DNS compliant response for at least a portion of the domain name from the one or more DNS servers;*

*creating a signed resource record that is DNSSEC compliant when the DNS compliant response from the one or more DNS servers is a denial of existence response for the requested domain name; and*

*sending the signed resource record to the requesting DNSSEC compliant computing device.*

*30. The method as set forth in claim 29, wherein the DNS servers are authoritative for a zone associated with the at least a portion of the domain name.*

*31. The method as set forth in claim 29, further comprising:*

*encrypting the signed resource record using a stored private key; and*

*performing a hash of the encrypted signed resource record prior to sending the signed resource record to the requesting DNSSEC compliant computing device.*

*32. The method as set forth in claim 25, wherein the at least a portion of the domain name comprises a top-level domain name that is known to be authenticated.*

*33. A system comprising one or more network traffic management devices, one or more servers, or one or more clients, the system comprising:*

*one or more processors; and*

*memory comprising programmed instructions stored in the memory, the one or more processors configured to be capable of executing the programmed instructions stored in the memory to:*

*receive a domain name system security extension (DNSSEC) request for a domain name from a DNSSEC compliant computing device;*

*generate a domain name system (DNS) request corresponding to the DNSSEC request for the domain name;*

*send the DNS request for the domain name to one or more DNS servers that are not DNSSEC compliant;*

*receive a DNS compliant response for at least a portion of the domain name from the one or more DNS servers;*

*create a signed resource record that is DNSSEC compliant when the DNS compliant response from the one or more DNS servers is a denial of existence response for the requested domain name; and*

*send the signed resource record to the requesting DNSSEC compliant computing device.*

*34. The system as set forth in claim 33, wherein the DNS servers are authoritative for a zone associated with the at least a portion of the domain name.*

*35. The system as set forth in claim 33, wherein the one or more processors are further configured to be capable of executing the programmed instructions stored in the memory to:*

*encrypt the signed resource record using a stored private key; and*

*perform a hash of the encrypted signed resource record prior to sending the signed resource record to the requesting DNSSEC compliant computing device.*

*36. The system as set forth in claim 33, wherein the at least a portion of the domain name comprises a top-level domain name that is known to be authenticated.*

* * * * *